(12) United States Patent
Tamura

(10) Patent No.: US 6,219,177 B1
(45) Date of Patent: Apr. 17, 2001

(54) OPTICAL AMPLIFYING APPARATUS, AN OPTICAL OUTPUT CONTROLLING METHOD BY THE OPTICAL AMPLIFYING APPARATUS, AND AN OPTICAL TRANSMITTING APPARATUS

(75) Inventor: Yuji Tamura, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/244,759

(22) Filed: Feb. 5, 1999

(30) Foreign Application Priority Data

Mar. 19, 1998 (JP) .................................................. 10-070818

(51) Int. Cl.⁷ ........................................................ H01S 3/00
(52) U.S. Cl. ............................................. 359/341; 359/124
(58) Field of Search .................................... 359/124, 341

(56) References Cited

U.S. PATENT DOCUMENTS 5,822,112 * 10/1998 Itou et al. ............................ 359/341

FOREIGN PATENT DOCUMENTS

| 5-199185 | 8/1993 | (JP) . |
| 7-154329 | 6/1995 | (JP) . |
| 7-240551 | 9/1995 | (JP) . |
| 7-244304 | 9/1995 | (JP) . |

* cited by examiner

Primary Examiner—Mark Hellner
(74) Attorney, Agent, or Firm—Staas & Halsey LLP

(57) ABSTRACT

An optical amplifying apparatus, an optical output controlling method by the optical amplifying apparatus and an optical transmitting apparatus, in which an optical output constant control is possible irrespective of an optical input level even when power-on is detected or an optical signal inputted after supply of pump light is stopped is recovered. The optical amplifying apparatus has an pump light outputting unit, an optical amplifier amplifying an input optical signal with pump light from the pump light outputting unit, an output constant control unit controlling the pump light outputting unit to keep a level of the amplified optical signal constant, an optical input monitoring unit, a pump light level setting unit setting an optical level of the pump light based on a result of optical input monitoring from the optical input monitoring unit, a pump light monitor control unit monitoring a level of the pump light to control the pump light outputting unit so as to stabilize an output level of the pump light at an optical level set by the pump light level setting unit, an input disconnection detecting unit, and an operation control switching unit switching a control mode for pump light to an output constant control mode, a pump light control mode or a stop control mode.

12 Claims, 12 Drawing Sheets

OPTICAL AMPLIFYING APPARATUS, AN OPTICAL OUTPUT CONTROLLING METHOD BY THE OPTICAL AMPLIFYING APPARATUS, AND AN OPTICAL TRANSMITTING APPARATUS

BACKGROUND OF THE INVENTION (1) Field of the Invention

The present invention relates to an optical amplifying apparatus, an optical output controlling method by the optical amplifying apparatus, and an optical transmitting apparatus suitable for use to control an optical amplifier in an optical communication system.

(2) Description of Related Art

An optical fiber amplifier using an optical fiber doped with mainly a rare earth element such as erbium (Er) or the like has features of high gain, low noise, etc., which plays an important role in an optical transmission system as an optical amplifier amplifying an optical signal without converting the optical signal into an electric signal.

In the optical transmitting system, the optical amplifier is required an optical output constant control to keep an optical output level constant in order to absorb a difference in level of optical inputs to the optical amplifier due to a difference in transmission path length.

An optical amplifying apparatus performing the optical output constant control will be now described with reference to FIG. 9. FIG. 9 is a diagram schematically showing a structure of the above optical amplifying apparatus.

The optical amplifying apparatus has, as shown in FIG. 9, optical/electric converting units 101 and 108, an input disconnection detecting unit 102, an operation sequence unit 103, a pumping source 104, a pumping source driving unit 105, an operation change-over switch 106, an optical output constant control unit 107, a first demultiplexer 109, isolators 110 and 113, an erbium-doped optical fiber 111 (hereinafter referred as EDF 111), a multiplexer 112, and a second demultiplexer 114.

The first demultiplexer 109 is configured with an optical fiber coupler, which sends an optical signal inputted to the optical amplifying apparatus to the isolator 110, while demultiplexing a part of the optical signal and sending the optical signal to the optical/electric converting unit 101. The optical/electric converting unit 101 converts the optical signal sent from the first demultiplexer 109 into an electric signal (voltage signal). In other words, the optical/electric converting unit 101 converts the optical signal demultiplexed by the first demultiplexer 109 into a voltage signal proportional to an optical input level of the optical signal, and sends the voltage signal as an input monitor signal to the input disconnection detecting unit 102.

The input disconnection detecting unit 102 compares the input monitor signal sent from the optical/electric converting unit 101 with a reference value set in advance in the input disconnection detecting unit 102, determines that input light is disconnected when the input monitor signal drops below the reference value, and notifies the operation sequence unit 103 that the input light is disconnected.

The operation sequence unit 103 controls an operation of the operation change-over switch 106. The operation sequence unit 103 controls the operation change-over switch 106 to stop the optical output constant control when notified of disconnection of the input light from the input disconnection detecting unit 102.

A power-on/recovery detecting unit not shown detecting that power is on or that the input light signal is recovered is connected to the operation sequence unit 103. When the power-on/recovery detecting unit detects that power is on or that the input optical signal is recovered, the operation sequence unit 103 is notified of that.

Namely, the operation sequence unit 103 controls the operation change-over switch 106 to perform the optical output constant control when the power-on/recovery detecting unit detects that power is on or that the input light is recovered.

An end of the operation change-over switch 106 is connected to the pumping source driving unit 105. The other end of the operation change-over switch 106 is switchabley connected to either the optical output constant control unit 107 or ground, so that the operation change-over switch 106 is selectively switched under a control of the above operation sequence unit 103. The other end of the operation change-over switch 106 is connected to the optical output constant control unit 107 when the inputted optical signal is in a steady state condition, while being grounded when the inputted optical signal is disconnected.

The pumping source driving unit 105 drives the pumping source 104 to generate pump light, which is controlled by the optical output constant control unit 107. The pumping source 104 is configured with a light emitting element such as a semiconductor laser diode or the like, which supplies an energy of the pumping source 104 to the EDF 111 to amplify inputted optical signal.

The multiplexer 112 is configured with an optical fiber coupler or the like, which outputs pump light outputted from the pumping source 104 to the EDF 111, while outputting optical signal amplified by the EDF 111 to the isolator 113. The isolators 110 and 113 are connected to the both ends of the EDF 111, which are served to prevent resonance of the optical amplifier caused by that amplified light amplified by the EDF 111 is fed back to the EDF 111.

The second demultiplexer 114 is configured with an optical fiber coupler or the like, which is demultiplexes a part of the optical signal amplified by the EDF 111 to use a part of the demultiplexed optical signal as an output optical signal, while sending the other part of the demultiplexed optical signal as monitor light to the optical/electric converting unit 108. The optical/electric converting unit 108 converts the optical signal sent from the second demultiplexer 114 into an electric signal (voltage signal), similarly to the optical/electric converting unit 101. Namely, the optical/electric converting unit 108 converts the optical signal demultiplexed by the second demultiplexer 114 into a voltage signal proportional to an optical output level of the optical signal, and sends the voltage signal as an output monitor signal to the optical output constant control unit 107.

The optical output constant control unit 107 controls the pumping source driving unit 105 on the basis of the output monitor signal from the optical/electric converting unit 108 such that a level (optical output level) of the output optical signal is stable. In concrete, the optical output constant control unit 107 compares the output monitor signal (voltage signal) inputted from the optical/electric converting unit 108 with a reference voltage value corresponding to a desired optical output set in advance, and controls the pumping source driving unit 105 such that pump light corresponding to a difference in voltage between the reference voltage value and the output monitor signal is outputted from the pumping source 104.

In the above structure, a part of an optical signal inputted to the apparatus through the optical fiber is demultiplexed by the first demultiplexer 109, sent to the EDF 111 through the isolator 110, and amplified with pump light inputted from the multiplexer 112 in the EDF 111. The amplified optical signal is sent to the second demultiplexer 114 through the isolator 113, and a part of the amplified optical signal is demultiplexed by the second demultiplexer 114, then outputted as an amplified optical signal (output light signal).

On the other hand, the part of the input light demultiplexed by the first demultiplexer 109 is sent to the optical/electric converting unit 101, and converted into a voltage signal proportional to an optical level of the input light in the optical/electric converting unit 101. The optical signal converted into the voltage signal is sent as an input monitor signal to the input disconnection detecting unit 102. The input disconnection detecting unit 102 compares a level of the input monitor signal with a reference value set in advance to detect whether the input light is disconnected or not.

In a state where the input disconnection detecting unit 102 does not detect input disconnection and an optical signal above a predetermined level is inputted to the inputting side for the purpose of optical amplification, that is, in a state where an optical signal to be inputted is in a steady state condition, the operation sequence unit 103 controls switching of the operation change-over switch 106 such that a control signal from the optical output constant control unit 107 is outputted to the pumping source driving unit 105.

In this case, a part of the amplified optical signal demultiplexed by the second demultiplexer 114 is converted into an output monitor signal which is an electric signal (voltage signal) by the optical/electric converting unit 108, and the output monitor signal is sent to the optical output constant control unit 107. The optical output constant control unit 107 compares the output monitor signal with a predetermined reference voltage value, and controls the pumping source driving unit 105 such that pump light at a level corresponding to a difference in voltage between the output monitor signal and the reference voltage value is outputted from the pumping source 104. Under the control of the optical output constant control unit 107, the pumping source driving unit 105 drives the pumping source 104 to supply pump light so that the EDF 111 obtains desired amplified light.

If the input monitor signal drops below the reference value when the input disconnection detecting unit 102 compares the input monitor signal with the reference value set in advance, the input disconnection detecting unit 102 determines that the input light is disconnected, and sends a signal notifying of disconnection of the input light to the operation sequence unit 103.

The operation sequence unit 103 notified of disconnection of the input light controls the operation change-over switch 106 in order to halt the optical output constant control to selectively switches a change-over switch in the operation change-over switch 106 from a side of the optical outputting control unit 107 to a side of ground, thereby grounding the pumping source driving unit 105. The pumping source driving units 105 halts the driving of the pumping source 104 by being grounded, so that inputting of the pump light from the pumping source 104 to the EDF 111 is stopped.

When power is again on or the input optical signal is recovered, the power-on/recovery detecting unit not shown sends a signal notifying of that to the operation sequence unit 103. The operation sequence unit 103 controls the operation change-over switch 106 to switch the change-over switch to the optical output constant control unit 107, thereby again performing the optical output constant control.

States of each of light at the time of power-on or input light recovery in the optical amplifying apparatus will be next described with reference to FIGS. 10(a) through 10(c). FIG. 10(a) is a diagram showing with time changes of input light at the time of power-on and input light recovery in the optical amplifying apparatus, FIG. 10(b) is a diagram showing with time changes of pump light at that time, and FIG. 10(c) is a diagram showing with time changes of output light at that time.

As soon as power of the optical amplifying apparatus is on and an optical signal is inputted to the optical amplifying apparatus [refer to A1 in FIG. 10(a)], pump light corresponding to a level of the input light is driven [refer to A2 in FIG. 10(b)], and the pump light is increased while generating a delay due to a transmission resistance of the circuit of the optical amplifying apparatus and the like [refer to A2 to A3 in FIG. 10(b)]. A little after an optical signal is inputted, outputting of the amplified optical signal is initiated [refer to A4 in FIG. 10(c)].

When the input light is disconnected [refer to A5 in FIG. 10(a)], the above input disconnection detecting unit 102 detects the input disconnection, outputting of the pump light is stopped by the operation sequence unit 103 and the operation change-over switch 106 [refer to A6 in FIG. 10(b)], thus optical output is also stopped [refer to A7 in FIG. 10(c)].

If an optical signal [refer to A8 in FIG. 10(a)] stronger than the optical light inputted the last time [refer to A1 in FIG. 10(a)] is inputted when the input light is recovered, pump light corresponding to a level of the input light is driven [refer to A9 in FIG. 10(b)]. The pump light is increased while generating a delay due to a transmission resistance of the circuit of the optical amplifying apparatus and the like [refer to A9 to A10 in FIG. 10(b)], then outputting of an amplified optical signal is initiated a little after the optical signal is inputted [refer to A11 in FIG. 10(c)].

However, in the case of the output constant control in the above optical amplifying apparatus, the input disconnection detecting unit 102 detects disconnection of input light, while the optical output constant control unit 107 controls the pumping source driving unit 105 to output pump light corresponding to the disconnected input light.

Namely, pump light is abruptly increased when power is on or input light is recovered in the optical amplifying apparatus [refer to A3 and A10 in FIG. 10(b)], and output light amplified by the pump light jumps up above a predetermined level for a moment before the output light is stabilized at a predetermined level [refer to A12 and A13 in FIG. 10(c)].

When such protruding output light is generated in the optical amplifier used in an optical transmission system, the generated protruding output light (excessive output) is accumulatively amplified while passing through optical transmission paths, other repeaters and the like, the excessive output light is further increased when the terminal receives the optical signal, which exerts an effect on qualities of optical components receiving the optical signal in the receiving unit.

In order to prevent pump light output from being abruptly increased and output light from being excessive, there has been a technique of decreasing a responsiveness of a circuit performing the optical amplifier output constant control. However, when a speed of the optical amplifier output constant control is decreased, the optical output constant function of the optical amplifier is degraded, such that fluctuation in level of the input light is prone to appear in the output light.

There has been also an optical output controlling technique by the optical amplifying apparatus performing a pump light output constant control to keep light output from the pumping source constant without performing the output constant control immediately after power is on or input light is recovered in the optical amplifier, or a current constant control to keep a driving current driving a pumping source constant.

Now, another optical amplifying apparatus using a pump light output constant control will be described with reference to FIG. 11. FIG. 11 is a diagram schematically showing a structure of another optical amplifying apparatus using a pump light output constant control.

The optical amplifying apparatus using a pump light output constant control has, as shown in FIG. 11, a timer 115 and a pump light control unit 116, additionally to the optical amplifying apparatus shown in FIG. 9. Further, the optical amplifying apparatus has an operation sequence unit 118 instead of the operation sequence unit 103 and an operation change-over switch 117 instead of the operation change-over switch 106. The other parts of the optical amplifying apparatus are similar to those of the optical amplifying apparatus shown in FIG. 9. Incidentally, like reference characters in the drawing designate like or corresponding parts, descriptions of which are thus omitted.

The operation sequence unit 118 controls an operation of the operation change-over switch 117. When inputted thereto a signal notifying that input light is disconnected from the input disconnection detecting unit 102, the operation sequence unit 118 controls the operation change-over switch 117 to halt the optical output constant control.

A power-on/recovery detecting unit not shown for detecting that power is on or that the input optical signal is recovered is connected to the operation sequence unit 118. When power is on or the input optical signal is recovered, the power-on/recovery detecting unit sends a signal notifying that power-on/recovery is detected to the operation sequence unit 118.

The timer 115 is connected to the operation sequence unit 118. The timer 115 sends a trigger signal indicating that counting is terminated to the operation sequence unit 118 after a predetermined period set in advance is elapsed from when the timer 115 receives a signal indicating initiation of counting from the operation sequence unit 118.

When the power-on/recovery detecting unit detects that power is on or that an input optical signal is recovered, the operation sequence unit 118 sends a trigger signal indicating initiation of counting to the timer 115, while controlling the operation change-over switch 117 to perform the pump light control until receiving a trigger signal indicating termination of the counting from the timer 115.

An end of the operation change-over switch 117 is connected to the pumping source driving unit 105, while the other end of the same is switchably connected to any one of the optical output constant control unit 107, the pump light control unit 116 or ground, thereby being selectively switched under a control of the operation sequence unit 118. The other end of the operation change-over switch 117 is connected to the optical output constant control unit 107 when an inputted optical signal is in a steady state condition, whereas being grounded when the operation sequence unit 118 is notified that the inputted optical signal is disconnected.

An end of the pump light control unit 116 is connected to the pumping source 104 to monitor pump light outputted from the pumping source 104. The other end of the pump light control unit 116 is connected to the operation change-over switch 117 to be selectively connected to the pumping source driving unit 105 by a change-over switch in the operation change-over switch 117, so as to perform the pump light output constant control by controlling the pumping source driving unit 105 such that a quantity of pump light outputted from the pumping source 104 is stabilized at a predetermined value set in advance.

The optical amplifying apparatus using the pump light output constant control with the above structure amplifies an optical signal inputted thereto through an optical fiber and outputs the optical signal, and performs the optical output constant control by the optical output constant control unit 107 on the basis of an optical signal (output monitor signal) demultiplexed by the second demultiplexer 114, similarly to the optical amplifying apparatus shown in FIG. 9. When an input of optical signal is disconnected, the operation sequence unit 118 controls the operation change-over switch 117 on the basis of an optical signal (input monitor signal) demultiplexed by the first demultiplexer 109 to connect the pumping source driving unit 105 to ground in order to halt the optical output constant control, thereby stopping inputting of pump light from the pumping source 104 to the EDF 111.

In the optical amplifying apparatus using the pump light output constant control shown in FIG. 11, when the operation sequence unit 118 is notified from the power-on/recovery detecting unit (not shown) that power is on or input light is recovered in the optical amplifying apparatus, the operation sequence unit 118 controls switching of the operation change-over switch 117 such as to shift a state of the pumping source driving unit 105 from an operation stop state (grounded) to a pump light constant control state by the pump light control unit 116. Further, the timer 115 starts to count with the above power-on/recovery detection information as trigger information.

The operation sequence unit 118 controls the operation change-over switch 117 on the basis of counting by the timer 115 such that the pump light control unit 116 performs the pump light output constant control until a predetermined time is elapsed When the predetermined time is elapsed, the operation sequence unit 118 controls switching of the operation change-over switch 117 to switch from the pump light constant control by the pump light controlling unit 116 to the optical output constant control by the optical output constant control unit 107.

Now, states of each light at the time of power-on and input light recovery in the other optical amplifying apparatus using the pump light output constant control will be described with reference to FIGS. 12(a) through 12(c). FIG. 12(a) is a diagram showing with time changes of input light at the time of power-on and input light recovery, FIG. 12(b) is a diagram showing with time changes of pump light at that time, and FIG. 12(c) is a diagram showing with time changes of output light at that time.

In the above optical amplifying apparatus shown in FIG. 11, when power is on and an optical signal is inputted [refer to B1 in FIG. 12(a)], the timer 115 starts to count, and the operation sequence unit 118 controls switching of the operation change-over switch 117 on the basis of counting by the timer 115 such that the pumping source driving unit 105 is connected to the pump light control unit 116 to perform the pump light output constant control until a predetermined time is elapsed [refer to B2 in FIG. 12(b)]. An optical signal amplified with the pump light is outputted [refer to B6 in FIG. 12(c)].

When the counting by the timer 115 is terminated after the predetermined time is elapsed [refer to B3 in FIG. 12(b)], the operation sequence unit 118 controls switching of the operation change-over switch 117 to connected the pumping source driving unit 105 to the optical output constant control unit 107 so as to perform the optical output constant control [refer to B4 in FIG. 12(b)]. Outputting of output light amplified with the pump light is initiated a little after the control is switched to the above optical output constant control [refer to B7 in FIG. 12(c)].

When the input light is disconnected [refer to B5 in FIG. 12(a)], the above input disconnection detecting unit 102 detects input disconnection, the operation sequence unit 118 controls switching of the operation change-over switch 117 to connect the pumping source driving unit 105 to ground, outputting of the pump light from the pumping source 104 to the EDF 111 is thereby stopped [refer to B8 in FIG. 12(b)], thus optical output is also stopped [refer to B9 in FIG. 12(c)].

When the input light is recovered and an optical signal stronger than the input light inputted the last time is inputted [refer to B10 in FIG. 12(a)], pump light corresponding to a level of the input light is driven [refer to B12 in FIG. 12(b)], then outputting of output light amplified with the pump light is initiated a little after that [refer to B13 in FIG. 10(c)].

When the output constant control is performed in the optical amplifying apparatus using the pump light constant control shown in FIG. 11, gain characteristics of the optical amplifier is approximately proportional to an energy of pump light outputted from the pumping source. For this, if a quantity of pump light or a pumping source driving current is so set in the pump light control unit 116 that a predetermined optical output is obtained even when input light is small, the optical output might exceed a predetermined optical input level when greater input light is inputted.

Accordingly, it is necessary to set the pump light output or the pumping source driving current in the pump light control unit 116 such that the optical output does not exceed the predetermined optical output even when the input light is at maximum. If the pump light control unit 116 is set as above, a predetermined optical output cannot be obtained when input light is small, and pump light output is abruptly increased when the counting by the timer 115 is completed and the optical output constant control is initiated [refer to B14 in FIG. 12(b)], and the optical output thus exceeds the predetermined optical input level [refer to B15 in FIG. 12(c)].

When the protruding output light is generated in the optical amplifying apparatus used in an optical transmission system, the generated protruding output (excessive output) light is accumulatively amplified while passing through transmission paths, other repeaters and the like, the excessive output light is further increased when the terminal receives the optical signal, the excessive output light thus affects on qualities of optical components receiving the optical signal in the receiving unit, as stated above.

SUMMARY OF THE INVENTION

In the light of the above problems, an object of the present invention is to provide an optical amplifying apparatus, an optical output controlling method by the optical amplifying apparatus and an optical transmitting apparatus, which can accomplish an optical output constant control (to prevent pump light from a pumping source from exceeding a predetermined optical level) irrespective of an optical input level even when power-on is detected or an optical signal is recovered after supply of the pump light is halted, by improving a control on the pump light output from the pumping source.

The present invention therefore provides an optical amplifying apparatus comprising a pump light outputting unit for outputting pump light, an optical amplifier for amplifying an inputted optical signal with the pump light outputted from the pump light outputting unit, an output constant control unit for controlling the pump light outputting unit such that a level of the optical signal amplified by the optical amplifier is constant, an optical input monitoring unit for monitoring an optical input to the optical amplifier, a pump light level setting unit for setting an optical level of the pump light on the basis of a result of the optical input monitoring from the optical input monitoring unit, a pump light monitor control unit for monitoring a level of the pump light from the pump light outputting unit and controlling the pump light outputting unit such that the monitored output level of the pump light is stabilized at the optical level set by the pump light level setting unit, an input disconnection detecting unit for detecting whether the optical input is disconnected or not on the basis of a result of the optical input monitoring from the optical input monitoring unit, and an operation control switching unit for switching a control mode for pump light outputted from the pump light outputting unit to the optical amplifier so that the pump light outputting unit operates in any one of control modes among an output constant control mode by the output constant control unit, a pump light control mode by the pump light monitor control unit, and a stop control mode to stop an output of the pump light from the pump light outputting unit.

The optical amplifying apparatus according to this invention detects whether an optical input is disconnected or not by means of the input disconnection detecting unit on the basis of a result of optical input monitoring from the optical input monitoring unit, and operates in the stop control mode to stop an output of the pump light when optical input disconnection is detected, so that no pump light is supplied to the optical amplifier when an optical input is disconnected. It is therefore possible to prevent a state that the pump light has an excessive gain. Further, the optical amplifying apparatus of this invention sets an optical level of pump light by the pump light level setting unit on the basis of a result of optical input monitoring from the input monitoring unit, monitors a level of the pump light from the pump light outputting unit by the pump light monitoring unit, and controls the pump light outputting unit such that an output level of the monitored pump light is stabilized at the optical level set by the pump light level setting unit, thereby switching a control mode for the pump light outputted from the pump light outputting unit to the optical amplifier by the operation control switching unit to operate the pump light outputting unit in the output constant control mode by the output constant control unit even when power-on is detected or the optical signal inputted after supply of the pump light is stopped is recovered. Accordingly, an excessive pump light for an inputted optical signal is not inputted to the optical amplifier, so that a constant optical level is kept without generation of an optical output at an excessive optical level. As a result, no effect is exerted on qualities of optical components connected in the following stage.

The present invention further provides an optical output controlling method by an optical amplifying apparatus having an optical amplifier being able to directly amplify an inputted optical signal with pump light comprising the steps of an output constant control step of controlling the pump light such that a level of the optical signal amplified by the optical amplifier is constant when the inputted optical signal is in a steady input state, a stop control step of stopping supply of the pump light controlled at the output constant control step to the optical amplifier when the inputted optical signal is disconnected, and a pump light control step of supplying pump light at a predetermined constant optical level set according to a level of the inputted optical signal when power-on is detected or an optical signal inputted after supply of the pump light is stopped at the stop control step is recovered, wherein when a predetermined time is elapsed from when pump light at the predetermined constant optical level is supplied at the pump light control step, a control is shifted to the output constant control step.

The optical output controlling method by the optical amplifying apparatus of this invention, it is possible to certainly prevent an optical output at an excessive optical level from being generated at the time of power-on or optical amplifying function recovery, so that no effect is exerted on qualities of optical components connected in the following stage.

The present invention still further provides an optical output controlling method by an optical amplifying apparatus having an optical amplifier being able to directly amplify an inputted optical signal with pump light comprising the steps of an output constant control step of controlling the pump light such that a level of the optical signal amplified by the optical amplifier is constant when the inputted optical signal is in a steady input state, a stop control step of stopping supply of the pump light controlled at the output constant control step to the optical amplifier when the inputted optical signal is disconnected, and a pump light control step of supplying pump light at a predetermined constant optical level set according to a level of the inputted optical signal when power-on is detected or an inputted optical signal is returned after supply of the pump light is stopped at the stop control step to the optical amplifier, wherein when a level of an optical signal outputted from the optical amplifier reaches a predetermined level after the pump light at the predetermined constant optical level is supplied at the pump light control step, a control is shifted to the output constant control step.

According to the optical output controlling method by the optical amplifying apparatus of this invention, pump light is controlled in the output constant control mode after output light reaches a predetermined optical level to perform optical amplification, so that a stable optical level of output light is obtained.

The present invention still further provides an optical transmitting apparatus having an optical signal generating unit for generating a transmit signal to be transmitted over an optical fiber as an optical signal, and an optical amplifying unit for amplifying the transmit signal generated in the optical signal generating unit and sending the optical signal to the optical fiber comprising the optical amplifying unit comprising a pump light outputting unit for outputting pump light, an optical amplifier for amplifying the optical signal inputted from the optical signal generating unit with the pump light outputted from the pump light outputting unit, an output constant control unit for controlling the pump light outputting unit such that a level of the optical signal amplified by the optical amplifier is constant, an optical input monitoring unit for monitoring an optical input to the optical amplifier, a pump light level setting unit for setting an optical level of the pump light on the basis of a result of the optical input monitoring from the optical input monitoring unit, a pump light monitor control unit for controlling the pump light outputting unit such that an output level of the pump light is stabilized at the optical level set by the pump light level setting unit, an input disconnection detecting unit for detecting whether the optical input is disconnected or not on the basis of the result of the optical input monitoring from the optical input monitoring unit, and an operation control switching unit for switching a control mode for pump light outputted from the pump light outputting unit to the optical amplifier so that the pump light outputting unit operates in any one of control modes among an output constant control mode by the output constant control unit, a pump light control mode by the pump light monitor control unit, and a stop control mode to stop an output of the pump light from the pump light optical output unit.

The optical transmitting apparatus of this invention having the optical signal generating unit generating a transmit signal to be transmitted over the optical fiber as an optical signal and an optical amplifier amplifying the transmit signal generated by the optical signal generating unit and sending the transmit signal to the optical fiber, does not send an optical signal at an excessive optical level to the optical fiber. It is therefore possible to avoid a phenomenon that an optical signal is accumulatively amplified while passing through transmission paths, other repeaters and the like, and such excessive output light is further increased when the terminal receives the optical signal, so that no effect is exerted on qualities of optical components receiving the optical signal in the receiving unit.

The present invention still further provides an optical transmitting apparatus having an optical amplifying unit for amplifying an optical signal inputted over an optical fiber, and a receive signal processing unit for performing a receive signal processing on the optical signal amplified by the optical amplifying unit comprising the optical amplifying unit comprising a pump light outputting unit for outputting pump light, an optical amplifier for amplifying the optical signal inputted through the optical fiber with the pump light outputted from the pump light outputting unit, an output constant control unit for controlling the pump light outputting unit such that a level of the optical signal amplified by the optical amplifier is constant, an optical input monitoring unit for monitoring an optical input to the optical amplifier, a pump light level setting unit for setting an optical level of the pump light on the basis of a result of the optical input monitoring from the optical input monitoring unit, a pump light monitor control unit for controlling the pump light outputting unit such that an output level of the pump light is stabilized at the optical level set by the pump light level setting unit, an input disconnection detecting unit for detecting whether the optical input is disconnected or not on the basis of the result of the optical input monitoring from the optical input monitoring unit, and an operation switching control unit for switching a control mode for pump light outputted from the pump light outputting unit to the optical amplifier so that the pump light outputting unit operates in any one of control modes among an output constant control mode by the output constant control unit, a pump light control mode by the pump light monitor control unit, and a stop control mode to stop an output of the pump light from the pump light outputting unit.

In the optical transmitting apparatus of this invention having the optical amplifier unit for amplifying an optical signal inputted through an optical fiber and a receive signal processing unit for performing a receive signal processing on the optical signal amplified by the optical amplifier unit, an optical signal at an excessive optical level is not generated when the optical signal is transmitted from the optical amplifier unit to the receive signal processing unit. It is therefore possible to avoid a phenomenon that an optical signal is accumulatively amplified while passing through transmission paths, other repeaters and the like, and the excessive output light is further increased when the terminal receives the optical signal, so that no effect is exerted on qualities of optical components receiving the optical signal in the receiving unit.

Figure 1:
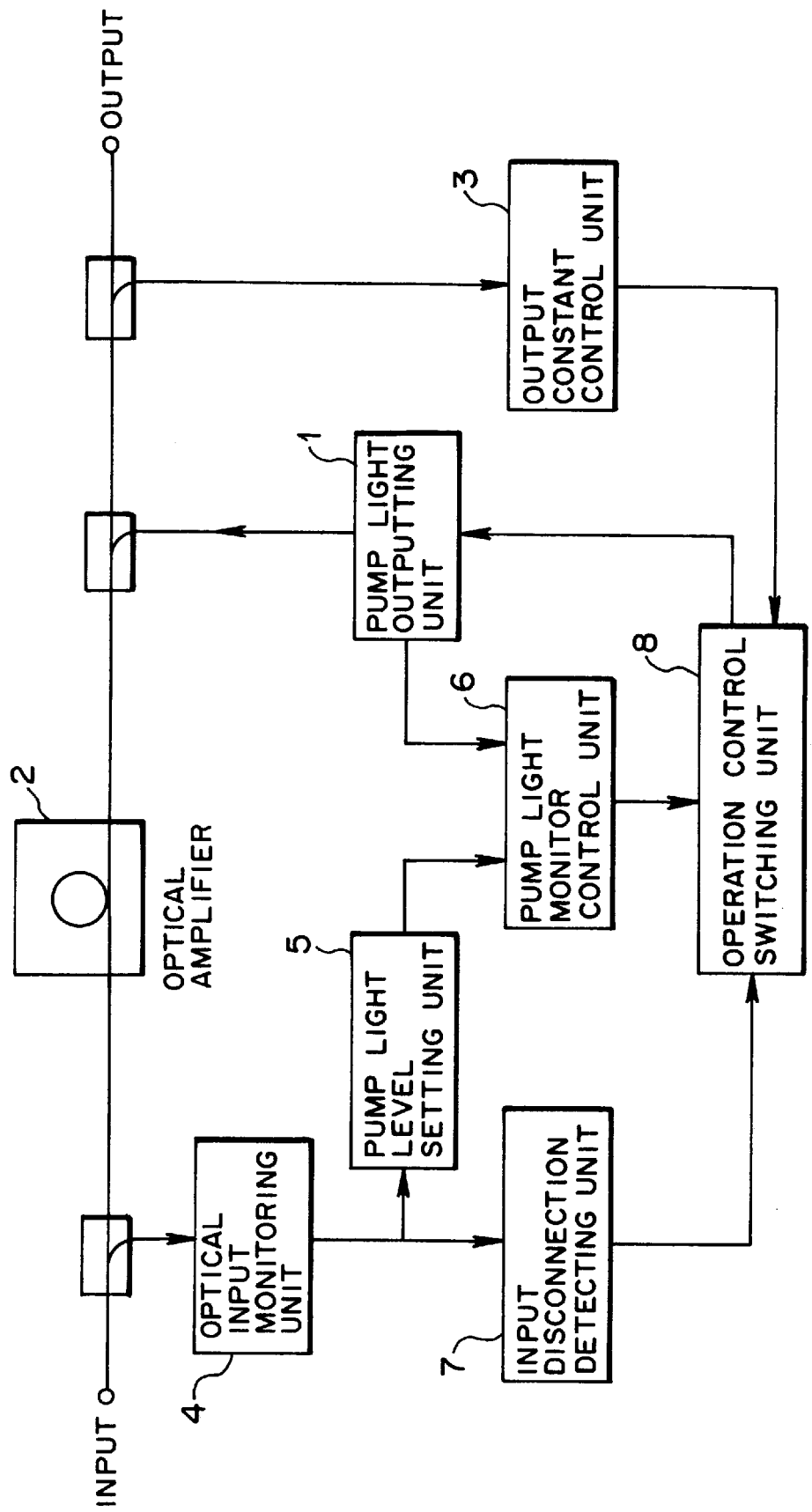
FIG. 1 is a block diagram showing an aspect of this invention.

DESCRIPTION OF THE PREFERRED EMBODIMENTS (a) Description of an Aspect of the Invention Now, description will be made of an aspect of the present invention with reference to the drawing.

FIG. 1 is a block diagram showing an aspect of this invention. In FIG. 1, reference numeral 1 denotes a pump light outputting unit, 2 an optical amplifier, 3 an output constant control unit, 4 an optical input monitor unit, 5 a pump light level setting unit, 6 a pump light monitor control unit, 7 an input disconnection detecting unit, and 8 an operation control switching unit.

The pump light outputting unit 1 outputs pump light. The optical amplifier 2 amplifies an inputted optical signal with the pump light outputted from the pump light outputting unit 1. The output constant control unit 3 controls the pump light outputting unit 1 such that a level of the optical signal amplified by the optical amplifier 2 is constant.

The optical input monitoring unit 4 monitors an optical input to the optical amplifier 2. The pump light level setting unit 5 sets an optical level of the pump light on the basis of a result of optical input monitoring from the optical input monitoring unit 4. The pump light monitor control unit 6 monitors a level of the pump light from the pump light outputting unit 1 to control the pump light outputting unit 1 such that an output level of the monitored pump light is stabilized at an optical level set by the pump light level setting unit 5.

The input disconnection detecting unit 7 detect whether an optical input is disconnected or not on the basis of a result of optical input monitoring from the optical input monitoring unit 4. The operation control switching unit 8 switches a control mode for the pump light outputted from the pump light outputting unit 1 to the optical amplifier 2 so that the pump light outputting unit 1 operates in any one of control modes among an output constant control mode by the output constant control unit 3, a pump light control mode by the pump light monitor control unit 6 and a stop control mode to stop an output of the pump light from the pump light outputting unit 1.

In the above structure, an inputted optical signal is amplified by the optical amplifier 2, then outputted. The operation control switching unit 8 switches a control mode for pump light such that the pump light outputting unit 1 operates in the output constant control mode by the output constant control unit 3, thereby controlling a level of the amplified optical signal constant.

The inputted optical signal is monitored by the optical input monitoring unit 4, then inputted to the input disconnection detecting unit 7. The input disconnection detecting unit 7 detects whether the optical input is disconnected or not on the basis of a result of optical input monitoring by the optical input monitoring unit 4. When detecting that the optical input is disconnected, the input disconnection detecting unit 7 notifies the operation control switching unit 8 that the optical input is disconnected. When notified from the input disconnection detecting unit 7 that the optical input is disconnected, the operation control switching unit 8 switches such that the pump light outputting unit 1 operates in the stop control mode to stop an output of the pump light from the pump light outputting unit 1, thereby stopping an output of the pump light to the optical amplifier 2.

At the time of power feeding or an optical amplifying function recovery, the operation control switching unit 8 switches the control mode for the pump light such that the pump light outputting unit 1 operates in the pump light control mode by the pump light monitor control unit 6, thereby outputting pump light controlled by the pump light monitor control unit 6 to the optical amplifier 2. Namely, the pump light level setting unit 5 sets an optical level of the pump light on the basis of a result of monitoring by the optical input monitor unit 4, the pump light monitor control unit 6 monitors a level of the pump light from the pump light outputting unit 1, and the operation control switching unit 8 controls the pump light outputting unit 1 such that an output level of the monitored pump light is stabilized at an optical level set by the pump light level setting unit 5, thereby supplying the pump light to the optical amplifier 2.

Further, when a predetermined time is elapsed after the pump light at a predetermined level is supplied in the pump light control mode by the pump light monitor control unit 6, the operation control switching unit 8 switches the control such that the pump light outputting unit 1 operates in the output constant control mode by the output constant control unit 3, thereby controlling a level of amplified optical signal constant.

The optical amplifying apparatus according to this invention detects whether an optical input is disconnected or not by means of the input disconnection detecting unit 7 on the basis of a result of optical input monitoring from the optical input monitoring unit 4, and operates in the stop control mode to stop an output of the pump light when optical input disconnection is detected, so that no pump light is supplied to the optical amplifier 2 when an optical input is disconnected. It is therefore possible to prevent a state the pump light holds an excessive gain. Further, the optical amplifying apparatus of this invention sets an optical level of pump light by the pump light level setting unit 5 on the basis of a result of optical input monitoring from the input monitoring unit 4, monitors a level of the pump light from the pump light outputting unit 1 by the pump light monitoring control unit 6, and controls the pump light outputting unit 1 such that an output level of the monitored pump light is stabilized at the optical level set by the pump light level setting unit 5, thereby switching a control mode for the pump light outputted from the pump light outputting unit 1 to the optical amplifier 2 by the operation control switching unit 8 to operate the pump light outputting unit 1 in the output constant control mode by the output constant control unit 3 even when power-on is detected or an optical signal is recovered after supply of the pump light is halted. Accordingly, an excessive pump light for an inputted optical signal is not outputted to the optical amplifier 2, so that a constant optical level is kept without generation of an optical output in an excessive optical level. As a result, no effect is exerted on qualities of optical components connected in the following stage.

The operation control switching unit may have a change-over switch for selectively switching a control signal from the output constant control unit or the pump light monitor control unit to supply the control signal to the pump light outputting unit, a power-on/recovery trigger signal outputting unit for outputting a predetermined power-on/recovery trigger signal when power is on or an optical amplification function is recovered, a constant controlling trigger signal outputting unit for outputting a constant controlling trigger signal to operate the pump light outputting unit in the output constant control mode after the power-on/recovery trigger signal is outputted from the power-on/recovery trigger signal outputting unit, and a switch control unit for controlling the change-over switch on the basis of each of the trigger signals from the power-on/recovery signal outputting unit and the constant controlling trigger signal outputting unit to operate the pump light outputting unit in the output constant control mode, the pump light control mode or the stop control mode.

Therefore, the above optical amplifying apparatus of this invention can prevent an optical output at an excessive optical level from being generated when power is on or the optical amplifying function is recovered. As a result, there is no possibility of an effect on qualities of optical components connected as the following stage.

The constant controlling trigger signal outputting unit may be configured with a timer being able to output the constant controlling trigger signal after a predetermined time is elapsed from when the power-on/recovery trigger signal is outputted from the power-on/recovery trigger signal outputting unit.

Therefore, the above optical amplifying apparatus of this invention can prevent an optical output at an excessive optical level from being generated when power is on or the optical amplifying function is recovered. As a result, there is no possibility of an effect on qualities of optical components connected as the following stage.

The constant controlling trigger signal outputting unit may have a level comparing unit for comparing an optical signal level amplified by the amplifier with a predetermined optical level set in advance, and when the amplified optical signal level is higher than the predetermined optical level as a result of the comparing by the level comparing unit, the constant controlling trigger signal outputting unit outputs the constant controlling trigger signal.

The above optical amplifying apparatus of this invention controls the pump light in the output constant control mode after the output light reaches a predetermined optical level so as to obtain a stable optical level of output light by performing the optical amplification.

The pump light monitor control unit may have a pump light level monitoring unit for monitoring a level of the pump light outputted from the pump light outputting unit, and a pump light level control unit for controlling the pump light outputting unit such that the level of the pump light monitored by the pump light level monitoring unit is stabilized at an optical level set in the pump light level setting unit.

Therefore, the above optical amplifying apparatus of this invention can prevent pump light at an excessive optical level for an inputted optical signal from being inputted to the optical amplifier so that an optical output at an excessive optical level is not generated. As a result, there is no possibility of an effect on qualities of optical components connected as the following stage.

The pump light monitor control unit may have a current/voltage converting unit for converting a driving current for outputting the pump light from the pump light outputting unit into a voltage signal, and a driving control unit for controlling the pump light outputting unit such that the voltage signal corresponding to a driving current for outputting the pump light converted by the current/voltage converting unit is stabilized at a voltage signal corresponding to the optical level set by the pump light level setting unit.

The above optical amplifying apparatus of this invention can directly monitor a driving current driving the pump light outputting unit so as to monitor an output of pump light more accurately. As a result, an optical level of an outputted optical signal is stabilized.

The optical input monitoring unit may output the result of monitoring as a voltage signal, and the pump light level setting unit may be configured with a voltage converting circuit for converting the voltage signal outputted as the result of monitoring from the optical input monitoring unit into a voltage signal indicating the set optical level of the pump light.

The above optical amplifying apparatus of this invention can control the pump light outputting unit certainly, which improves reliability of the apparatus. Further, the pump light level setting unit can be configured with a simplified structure, which leads to an improvement of reliability of the apparatus and realization of an economical configuration of the apparatus.

An optical output controlling method by an optical amplifying apparatus of this invention having an optical amplifier being able to directly amplify an inputted optical signal with pump light comprises the steps of an output constant control step of controlling the pump light such that a level of the optical signal amplified by the optical amplifier is constant when the inputted optical signal is in a steady input state, a stop control step of stopping supply of the pump light controlled at the output constant control step to the optical amplifier when the inputted optical signal is disconnected, and a pump light control step of supplying pump light at a predetermined constant optical level set according to a level of the inputted optical signal to the optical amplifier when power-on is detected or an inputted optical signal inputted after supply of the pump light is stopped at the stop control step is recovered, wherein when a predetermined time is elapsed from when pump light at the predetermined constant optical level is supplied at the pump light control step, a control is shifted to the output constant control step.

According to the above optical output controlling method by an optical amplifying apparatus of this invention, it is possible to certainly prevent an optical output at an excessive optical level from being generated when power is on or an optical amplifying function is recovered, so that no effect is exerted on qualities of optical components connected as the following stage.

Further, an optical output controlling method of this invention by an optical amplifying apparatus having an optical amplifier being able to directly amplify an inputted optical signal with pump light comprises the steps of an output constant control step of controlling the pump light such that a level of the optical signal amplified by the optical amplifier is constant when the inputted optical signal is in a steady input state, a stop control step of stopping supply of the pump light controlled at the output constant control step to the optical amplifier when the inputted optical signal is disconnected, and a pump light control step of supplying pump light at a predetermined constant optical level set according to a level of the inputted optical signal to the optical amplifier when the inputted optical signal is recovered or power-on is detected after supply of the pump light is stopped at the stop control step, wherein when a level of an optical signal outputted from the optical amplifier reaches a predetermined level after the pump light at the predetermined constant optical level is supplied at the pump light control step, a control is shifted to the output constant control step.

According to the above optical output controlling method by an optical amplifying apparatus of this invention, pump light is controlled in the output constant control mode after output light reaches a predetermined optical level, and optical amplification is performed, whereby a stabilized optical level of output light is obtained.

An optical transmitting apparatus of this invention having an optical signal generating unit for generating a transmit signal to be transmitted over an optical fiber as an optical signal, and an optical amplifying unit for amplifying said transmit signal generated in said optical signal generating unit and sending said optical signal to said optical fiber comprises the optical amplifying unit comprising a pump light outputting unit for outputting pump light, an optical amplifier for amplifying the optical signal inputted from the optical signal generating unit with the pump light outputted from the pump light outputting unit, an output constant control unit for controlling the pump light outputting unit such that a level of the optical signal amplified by the optical amplifier is constant, an optical input monitoring unit for monitoring an optical input to the optical amplifier, a pump light level setting unit for setting an optical level of the pump light on the basis of a result of the optical input monitoring from the optical input monitoring unit, a pump light monitor control unit for controlling the pump light outputting unit such that an output level of the pump light is stabilized at the optical level set by the pump light level setting unit, an input disconnection detecting unit for detecting whether the optical input is disconnected or not on the basis of the result of the optical input monitoring from the optical input monitoring unit, and an operation control switching unit for switching a control mode for pump light outputted from the pump light outputting unit to the optical amplifier so that the pump light outputting unit operates in any one of control modes among an output constant control mode by the output constant control unit, a pump light control mode by the pump light monitor control unit, and a stop control mode to stop an output of the pump light from the pump light outputting unit.

The above optical transmitting apparatus having an optical signal generating unit generating a transmit signal to be transmitted over an optical fiber as an optical signal and an optical amplifying unit amplifying the transmit signal generated by the optical signal generating unit and sending the signal to the optical fiber does not send an optical signal at an excessive optical level. Therefore, it is possible to avoid a phenomenon that an optical signal is accumulatively amplified while passing through transmission paths, other repeaters and the like, and the excessive output light is further increased when the terminal receives the optical signal so that no effect is exerted on qualities of optical components receiving the optical signal in the receiving unit.

An optical transmitting apparatus of this invention having an optical amplifying unit for amplifying an optical signal inputted over an optical fiber, and a receive signal processing unit for performing a receive signal processing on the optical signal amplified by the optical amplifying unit comprises the optical amplifying unit comprising a pump light outputting unit for outputting pump light, an optical amplifier for amplifying the optical signal inputted through the optical fiber with the pump light outputted from the pump light outputting unit, an output constant control unit for controlling the pump light outputting unit such that a level of the optical signal amplified by the optical amplifier is constant, an optical input monitoring unit for monitoring an optical input to the optical amplifier, a pump light level setting unit for setting an optical level of the pump light on the basis of a result of the optical input monitoring from the optical input monitoring unit, a pump light monitor control unit for controlling the pump light outputting unit such that an output level of the pump light is stabilized at the optical level set by the pump light level setting unit, an input disconnection detecting unit for detecting whether the optical input is disconnected or not on the basis of the result of the optical input monitoring from the optical input monitoring unit, and an operation control switching unit for switching a control mode for pump light outputted from the pump light outputting unit to the optical amplifier so that the pump light outputting unit operates in any one of control modes among an output constant control mode by the output constant control unit, a pump light control mode by the pump light monitor control unit, and a stop control mode to stop an output of the pump light from the pump light outputting unit.

In the optical transmitting apparatus of this invention having an optical amplifying unit amplifying an optical signal inputted through an optical fiber and a receive signal processing unit performing a receive signal processing on the optical signal amplified by the optical amplifying unit, an optical signal at an excessive optical level is not generated when the optical signal is transmitted from the optical amplifying unit to the receiving signal processing unit. It is therefore possible to avoid a phenomenon that an optical signal is accumulatively amplified while passing through transmission path, other repeaters and the like, and the excessive output light is further increased when the terminal receives the optical signal, so that no effect is exerted on optical components receiving the optical signal in the receiving unit.

(b) Description of a First Embodiment of the Invention

Now, description will be made of a first embodiment of this invention with reference to the drawings.

Figure 2:
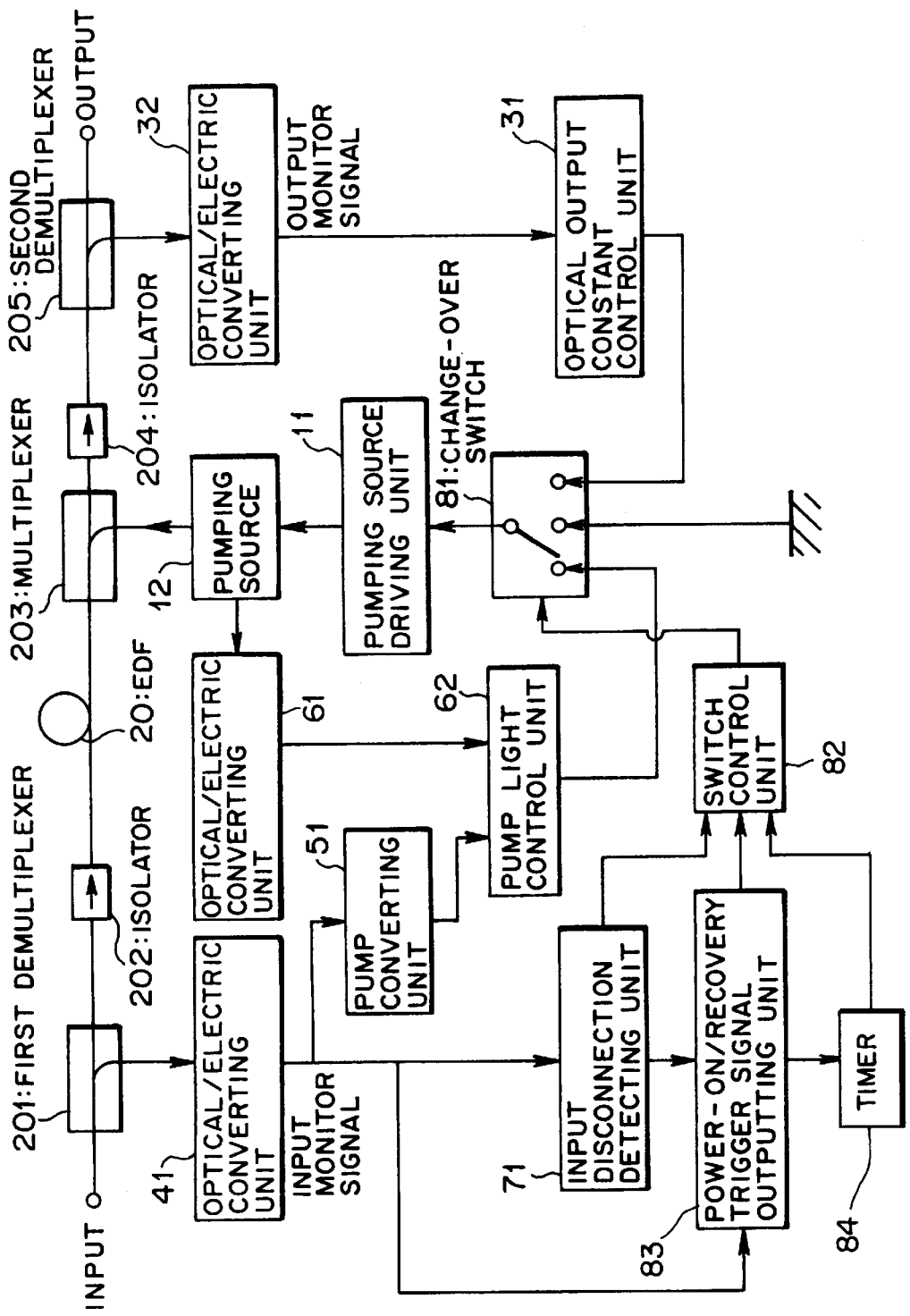
FIG. 2 is a block diagram showing a structure of an optical amplifying apparatus according to a first embodiment of this invention.
Figure 5:
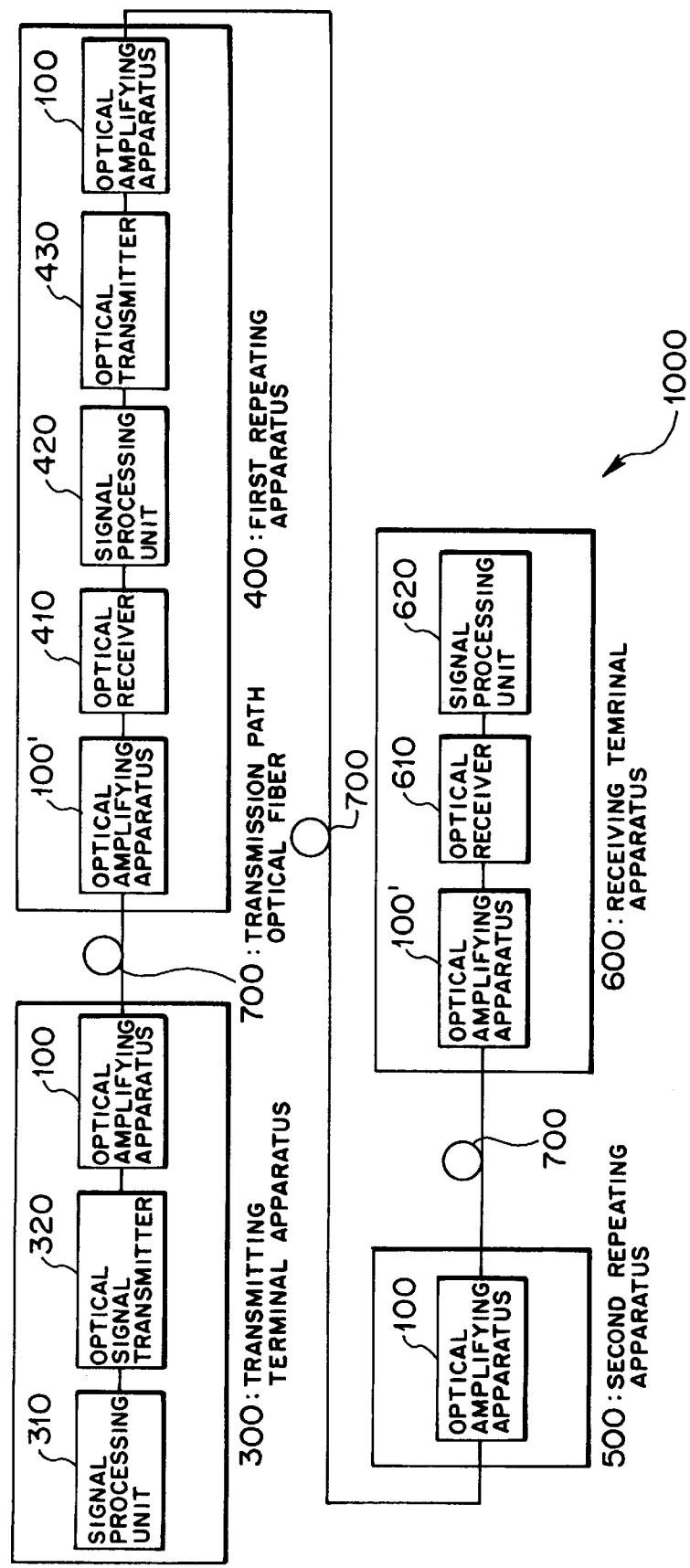
FIG. 5 is a block diagram schematically showing a structure of an optical transmitting apparatus using the optical amplifying apparatus according to the first embodiment of this invention.

FIG. 2 is a block diagram showing a structure of an optical amplifying apparatus according to the first embodiment of this invention. The optical amplifying apparatus shown in FIG. 2 can be used in an optical transmitting apparatus 1000 in an optical transmission system transmitting an optical signal over a transmission path optical fiber as shown in FIG. 5, for example.

In the optical transmitting apparatus 1000 shown in FIG. 5, each of optical amplifying apparatus 100 and 100' has approximately the same structure as that of the optical amplifying apparatus shown in FIG. 2, which is used as an optical amplifying apparatus amplifying an inputted optical signal, detailed description of which will be described later.

The optical amplifying apparatus 100 functions as a high power amplifier for transmitting an optical signal, which corresponds to the optical amplifying unit amplifying a transmit signal generated in an optical signal generating unit, and sending the signal to a transmission path optical fiber 700 (optical fiber). The optical amplifier 100' functions as a low power amplifier for receiving, which corresponding to the optical amplifying unit amplifying an optical signal inputted through the optical fiber.

The optical transmitting apparatus 1000 has a transmitting terminal apparatus 300, a first repeating apparatus 400, a second repeating apparatus 500, a receiving terminal apparatus 600 and the transmission path optical fiber (optical fiber) 700, which is a transmission system in which an optical signal transmitted from the transmitting terminal apparatus 300 is received by the receiving terminal apparatus 600.

The optical transmitting apparatus 1000 corresponds to the optical transmitting apparatus having the optical signal generating unit generating a transmit signal to be transmitted over an optical fiber as an optical signal, and the optical amplifying unit amplifying the transmit signal generated by the optical signal generating unit and sending the signal to the optical fiber, while corresponding to the optical transmitting apparatus having the optical amplifying unit amplifying an optical signal inputted through an optical fiber, and the receive signal processing unit for performing a receive signal processing on the optical signal amplified by the optical amplifying unit.

The transmitting terminal apparatus 300 has a signal processing unit 310, an optical signal transmitter 320 and an optical amplifying apparatus 100, which is a transmitting terminal transmitting data to be transmitted as an optical signal. The signal processing unit 310 processes data to be transmitted to obtain a digital signal (electric signal). The optical signal transmitter 320 converts the data processed by the signal processing unit 310 into an optical signal. In the transmitting terminal apparatus 300, the signal processing unit 310 and the optical signal transmitter 320 correspond to the optical signal generating unit.

The first repeating apparatus 400 has optical amplifying apparatus 100 and 100', an optical receiver 410, a signal processing unit 420 and an optical transmitter 430, which is a repeating apparatus receiving an optical signal sent from the transmitting terminal apparatus 300, reconstructing the optical signal as a digital signal (electric signal), again converting the digital signal into an optical signal, and transmitting the optical signal.

The optical receiver 410 processes the optical signal amplified by the optical amplifying apparatus 100' to obtain a digital signal. The signal processing unit 420 reconstructs the data converted into a digital signal by the optical receiver 410 at a timing newly set. The optical transmitter 430 again converts the data reconstructed by the signal processing unit 420 into an optical signal. In the first repeating apparatus 400, the optical receiver 410 and the signal processing unit 420 correspond to the receive signal processing unit, whereas the signal processing unit 420 and the optical transmitter 430 corresponds to the optical signal generating unit.

The second repeating apparatus 500 has an optical amplifying apparatus 100, which amplifies an inputted optical signal and outputs the signal.

The receiving terminal apparatus 600 has an optical amplifying apparatus 100', an optical receiver 610 and a signal processing unit 620, which is a receiving terminal amplifying a received optical signal, and processing the signal as data. The optical signal receiver 610 converts the optical signal amplified by the optical amplifying apparatus 100' into a digital signal. The signal processing unit 620 processes the digital signal converted into the digital signal by the optical receiver 610 as data. In the receiving terminal apparatus 600, the optical amplifying apparatus 100' and the optical receiver 610 correspond to the receive signal processing unit.

The transmission path fiber 700 is an optical fiber connecting the transmitting terminal apparatus 300 to the first repeating apparatus 400, the first repeating apparatus 400 to the second repeating apparatus 500, and the second repeating apparatus 500 to the receiving terminal apparatus 600.

The optical transmitting apparatus using the optical amplifying apparatus according to the first embodiment of this invention has the above structure, in which transmit data processed by the signal processing unit 310 in the transmitting terminal apparatus 300 is converted into an optical signal by the optical signal transmitter 320, amplified by the optical amplifying apparatus 100 and transmitted to the first repeating apparatus 400 over the transmission path optical fiber 700.

In the first repeating apparatus 400, the inputted optical signal is amplified by the optical amplifying apparatus 100 to an optical level processable by the optical receiver 410 in the following step, converted into a digital signal by the optical receiver 410, then reconstructed by the signal processing unit 420 at a timing newly set. The data converting into the digital signal is again converted into an optical signal in the optical transmitter 430, amplified by the optical amplifying apparatus 100, then transmitted to the second repeating apparatus 500 over the transmission path optical fiber 700. Namely, the optical signal inputted to the first repeating apparatus 400 is regenerated as a digital signal by the signal processing unit 420, again converted into an optical signal, and transmitted.

In the second repeating apparatus 500, the inputted optical signal is amplified by the optical amplifying apparatus 100, and transmitted to the receiving terminal apparatus 600 over the transmission path optical fiber 700.

In the receiving terminal apparatus 600, the inputted optical signal is amplified by the optical amplifying apparatus 100' to a level processable by the optical receiver 610 in the following step, converted into a digital signal by the optical receiver 610, then processed as data by the signal processing unit 620.

Figure 3:
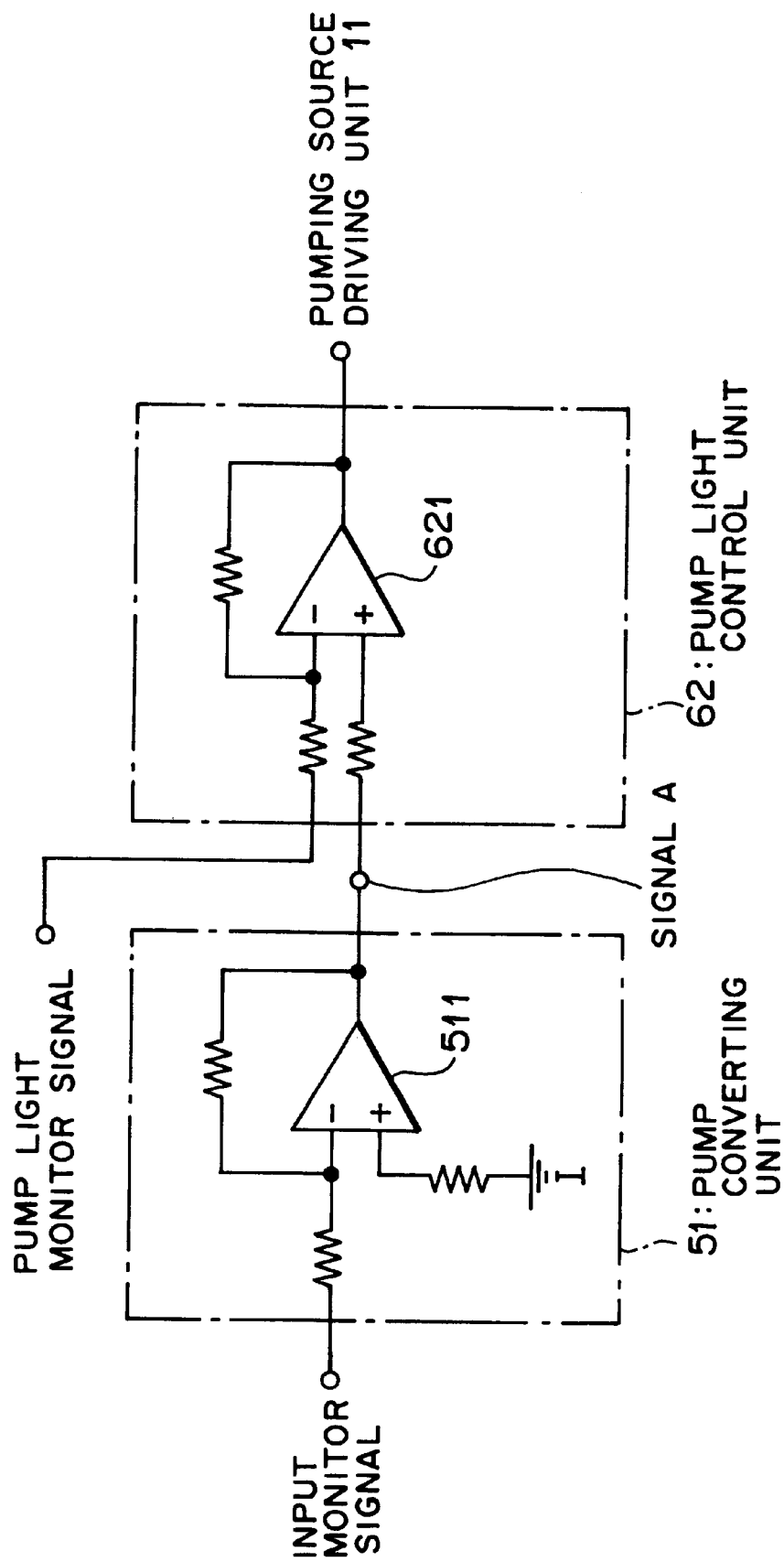
FIG. 3 is a circuit diagram showing circuit structures of a pump converting unit and a pump light control unit.

The optical amplifying apparatus 100 and 100' used in the above optical transmitting apparatus will be described in detail with reference to the drawings. FIGS. 2 and 3 show an optical amplifying apparatus and an optical output controlling method by the optical amplifying apparatus according to the first embodiment of the invention. FIG. 2 is a block diagram showing a structure of the optical amplifying apparatus according to the first embodiment of this invention, and FIG. 3 is a circuit diagram showing circuit structures of a pump converting unit and a pump light control unit.

The optical amplifying apparatus according to the first embodiment of this invention has, as shown in FIG. 2, a first demultiplexing unit 201, isolators 202 and 204, a multiplexer 203, a second demultiplexer 205, a pumping source driving unit 11, a pumping source 12, an EDF 20, an optical output constant control unit 31, optical/electric converting units 32, 41 and 61, a pump converting unit 51, a pump light control unit 62, an input disconnection detecting unit 71, a change-over switch 81, a switch control unit 82, a power-on/recovery trigger signal outputting unit 83, and a timer 84.

The erbium-doped fiber 20 (hereinafter referred as EDF 20) amplifies an inputted optical signal with pump light outputted from the pumping source 12, which corresponds to the optical amplifier.

The optical/electric converting unit 41 outputs an optical signal (a result of monitoring) sent from the first demultiplexing unit 201 as an electric signal (voltage signal). The optical/electric converting unit 41 converts the optical signal demultiplexed by the first demultiplexing unit 201 into a voltage signal proportional to an optical input level of the optical signal, and sends the voltage signal as an input monitor signal to the input disconnection detecting unit 71, the pump converting unit 51 and the power-on/recovery trigger signal outputting unit 83, which corresponds to the optical input monitoring unit.

The pump converting unit 51 is configured with a voltage converting circuit converting the voltage signal outputted as a result of the monitoring from the optical/electric converting unit 41 into a voltage signal indicating a set optical level of pump light, which corresponds to the pump light level setting unit.

The input disconnection detecting unit 71 compares the input monitor signal sent from the optical/electric converting unit 41 with a reference value set in advance in the input disconnection detecting unit 71, determines that the input light is disconnected when the input monitor signal drops below the reference value, and notifies the switch control unit 82 and the power-on/recovery trigger signal outputting unit 83 that the input light is disconnected, which corresponds to the input disconnection detecting unit.

The power-on/recovery trigger signal outputting unit 83 detects that power is on or that the optical amplifying function is recovered, and outputs a predetermined power-on/recovery trigger signal to the timer 84 and the switch control unit 82 which are the constant controlling trigger signal outputting unit.

The timer 84 measures an elapsed time from when the power-on/recovery trigger signal is inputted from the power-on/recovery trigger signal outputting unit 83. The timer 84 outputs a constant controlling trigger signal to the switch control unit 82 after a predetermined time is elapsed from when the power-on/recovery trigger signal is inputted.

The switch control unit 82 controls switching of the change-over switch 81 on the basis of each trigger signal from the input disconnection detecting unit 71, the power-on/recovery trigger signal outputting unit 83 or the timer 84 so that the pumping source driving unit 11 operates in any one of control modes among an output constant control mode, a pump light control mode or a stop control mode.

An end of the change-over switch 81 is connected to the pumping source driving unit 11, while the other end of the same is switchably connected to the optical output constant control unit 31, the pump light control unit 62 or ground. The change-over switch 81 is selectively switched under a switch control by the switch control unit 82.

The power-on/recovery trigger signal outputting unit 83, the timer 84, the switch control unit 82 and the change-over switch 81 correspond to the operation switching unit.

The optical/electric converting unit 32 outputs an optical signal (a result of monitoring) sent from the second demultiplexer 205 as an electric signal (voltage signal), similarly to the above optical/electric converting unit 41. In other words, the optical/electric converting unit 32 converts an optical signal demultiplexed by the second demultiplexer 205 into a voltage signal proportional to an optical input level of the optical signal, and sends the voltage signal as an output monitor signal (voltage signal) to the optical output constant control unit 31.

The optical output constant control unit 31 controls the pumping source driving unit 11 in the output constant control mode on the basis of the output monitor signal from the optical/electric converting unit 32 such that a level (optical output level) of the output optical signal amplified by the EDF 20 is constant. In concrete, the optical output constant control unit 31 compares the output monitor signal sent from the optical/electric converting unit 32 with a reference voltage value corresponding to a desired optical output set in advance, and controls the pumping source driving unit 11 such that pump light at a level corresponding to a difference in voltage between the reference voltage value and the output monitor signal is outputted from the pumping source 12.

Incidentally, the optical/electric converting unit 32 and the optical output constant control unit 31 correspond to the operation switching unit.

The pumping source driving unit 11 drives the pumping source 12 to generate pump light, which is selectively controlled by the optical output constant control unit 31 or the pump light control unit 62. The pumping source 12 is configured with a light emitting element such as a semiconductor laser diode or the like, which supplies an energy of the pumping source 12 to the EDF 20, thereby amplifying inputted signal light. Backward light from the pumping source 12 is inputted to the optical/electric converting unit 61.

Incidentally, the pumping source driving unit 11 and the pumping source 12 correspond to the pump light outputting unit.

The optical/electric converting unit 61 as the pump light level monitoring unit converts the backward light of pump light outputted from the pumping source 12 into a voltage signal proportional to a level of the pump light, similarly to the optical/electric converting units 41 and 32, and sends the voltage signal as a pump light monitor signal (voltage signal) obtained by monitoring a level of the pump light to the pump light converting unit 62, which is configured with, for example, a photodiode.

The pump light control unit 62 controls the pumping source driving unit 11 such that a level of the pump light monitored by the optical/electric converting unit 61 is stabilized at an optical level set by the pump converting unit 51, which corresponds to the pump light level control unit.

Incidentally, the optical/electric converting unit 61 and the pump light control unit 62 correspond to the pump light monitor control unit.

Now, circuit structures of the pump converting unit 51 and the pump light control unit 62 will be described with reference to FIG. 3. The pump converting unit 51 is configured with a voltage converting circuit having an amplifier 511 and three resistors. The pump converting unit 51 converts the input monitor signal (voltage signal) sent from the optical/electric converting unit 41 into an optical level ("set optical level of pump light") of pump light corresponding to the input monitor signal by the amplifier 511 according to a conversion rate set in advance, then outputs a signal indicating the "set optical level of pump light" (signal A) to the pump light control unit 62.

The pump light control unit 62 has an amplifier 621 and three resistors. The pump light control unit 62 receives the signal A indicating the "set optical level of pump light" outputted from the pump converting unit 51 and a pump light monitor signal indicating an "actual optical level of pump light" outputted from the optical/electric converting unit 61, and outputs a control signal to the pumping source driving unit 11 so that the pump light monitor signal indicating the "actual optical level of pump light" becomes equal to the signal A indicating the "set optical level of pump light".

The multiplexer 203 is configured with an optical fiber coupler or the like, which inputs pump light outputted from the pumping source 12 to the EDF 20. The isolators 202 and 204 are connected to the both ends of the EDF 20, which are used to prevent the optical amplifier from oscillating, because of amplified light amplified by the EDF 20 being fed back to the EDF 20.

The first demulatiplexer 201 is configured with an optical fiber coupler or the like, which transmits an optical signal inputted to the apparatus to the isolator 202, while demultiplexing a part of the optical signal and sending the optical signal to the optical/electric converting unit 41. The second demultiplexer 205 is configured with an optical fiber or the like, similarly to the first demultiplexer 201, which demultiplexes a part of an amplified optical signal and sends the optical signal to the optical/electric converting unit 32.

In the optical amplifying apparatus with the above structure according to the first embodiment of this invention, a part of an optical signal inputted to the apparatus is demultiplexed by the first demultiplexer 201, sent to the EDF 20 through the isolator 202, then amplified with pump light inputted from the multiplexer 203 in the EDF 20. The amplified optical signal is sent to the second demultiplexer 205 through the isolator 204, and a part of the optical signal is demultiplexed by the second demultiplexer 205 and outputted as an amplified optical signal.

Figure 4:
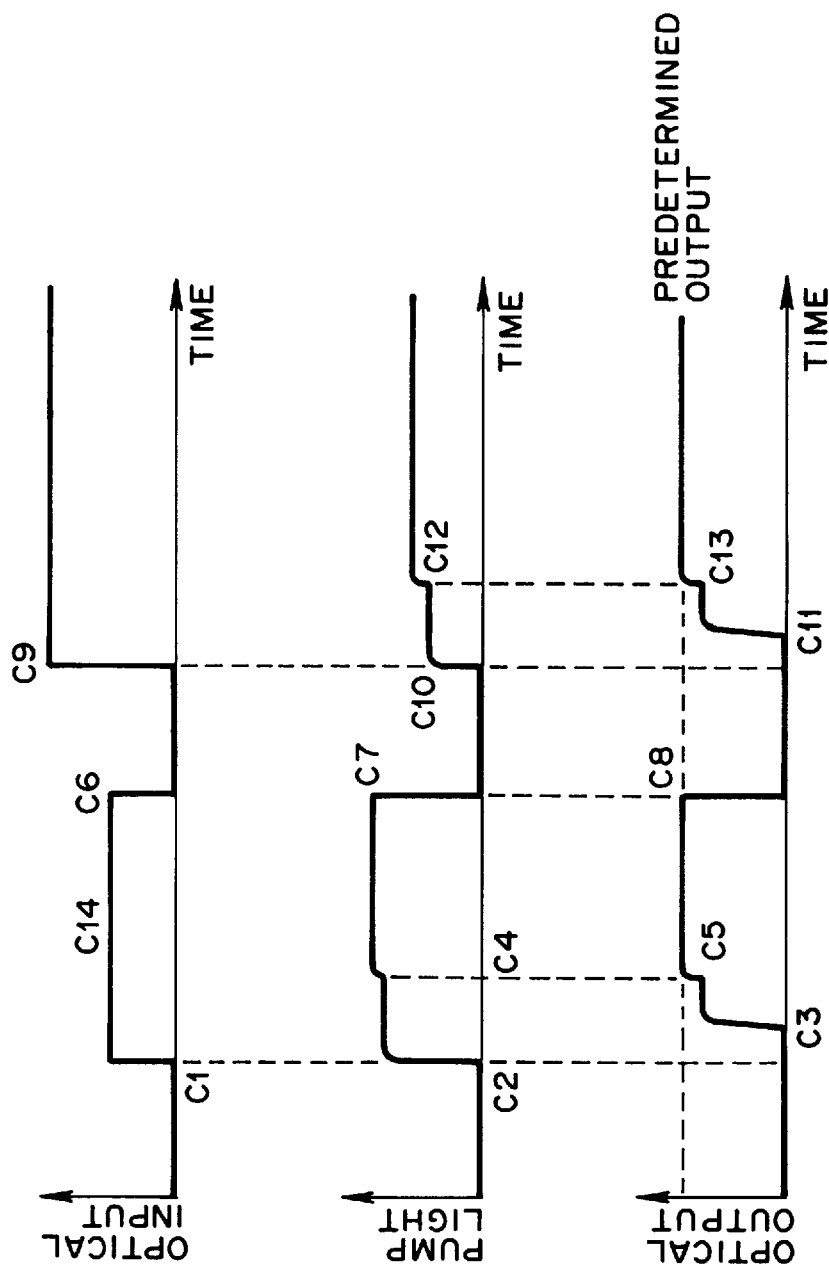
FIGS. 4(a) through 4(c) are diagrams showing with time changes of each light at the time of power-on and input light recovery in the optical amplifying apparatus according to the first embodiment of this invention.

Now, changes of states of input light, pump light and output light in the apparatus will be described with reference to FIGS. 4(a) through 4(c). FIG. 4(a) is a diagram showing with time changes of input light at that time when power is on and input light is recovered, FIG. 4(b) is a diagram showing with time changes of pump light at that time, and FIG. 4(c) is a diagram showing with time changes of output light at that time.

When power is on and an optical signal is inputted to the apparatus [refer to C1 in FIG. 4(a)], a part of the optical signal inputted to the apparatus is demultiplexed by the first demultiplexer 201, sent to the optical/electric converting unit 41, and converted to a voltage signal corresponding to an input optical level of the optical signal in the optical/electric converting unit 41. The optical signal converted into the voltage signal is sent as an input monitor signal to the power-on/recovery trigger signal outputting unit 83, the pump converting unit 51 and the input disconnection detecting unit 71.

The power-on/recovery trigger signal outputting unit 83 outputs a power-on/recovery trigger signal to the timer 84 and the switch control unit 82 as soon as the input monitor signal is inputted. The switch control unit 82 receiving the power-on/recovery trigger signal from the power-on/recovery trigger signal outputting unit 83 controls switching of the change-over switch 81 to connect the pumping source driving unit 11 to the pump light control unit 62 so that the pumping source driving unit 11 operates in the pump light control mode.

Pump light outputted from the pumping source 12 is also inputted to the optical/electric converting unit 61, converted into a voltage signal in the optical/electric converting unit 61, and inputted as a pump light monitor signal to the pump light control unit 62.

The input monitor signal inputted from the optical/electric converting unit 41 is also sent to the pump converting unit 51. The pump converting unit 51 sets an optical level of pump light to be outputted from the pumping source 12 on the basis of the inputted input monitor signal, and sends a voltage signal corresponding to the set optical level of pump light to the pump light control unit 62.

The pump light control unit 62 compares the pump light monitor signal inputted from the optical/electric converting unit 61 with a set value of an optical level of pump light inputted from the pump converting unit 51, and controls the pumping source driving unit 11 such that the pump light monitor signal inputted from the optical/electric converting unit 61 becomes equal to the set value of an optical level of pump light inputted from the pump converting unit 51.

Namely, the pumping source driving unit 11 makes the pumping source 12 output pump light to the EDF 20 in a state where the pumping source driving unit 11 is controlled by the pump light control unit 62 in the pump light control mode [refer to C2 in FIG. 4(b)], so that an optical signal amplified with the pump light in the EDF 20 is outputted [refer to C3 in FIG. 4(c)].

The timer 84 receiving the power-on/recovery trigger signal from the power-on/recovery trigger signal outputting unit 83 starts to count, and outputs a constant controlling trigger signal to the switch control unit 82 after a predetermined time is elapsed [refer to C4 in FIG. 4(b)].

The switch control unit 82 receiving the constant controlling trigger signal from the timer 84 controls switching of the change-over switch 81 such that the pumping source driving unit 11 operates this time in the output constant control mode. Namely, the pumping source driving unit 11 is connected to the optical output constant control unit 31, and makes the pumping source 12 output pump light in a state where the pumping source driving unit 11 is controlled in the output constant control mode by the optical output constant control unit 31 [refer to C4 in FIG. 4(b)], so that output light amplified with the pump light is outputted [refer to C5 in FIG. 4(c)].

In a state where an optical signal above a predetermined level is inputted to this apparatus for the purpose of optical amplification, that is, in a state where an inputted optical signal is in a steady input state, a part of the amplified optical signal demultiplexed by the second demultiplexer 205 is converted into an output monitor signal which is an electric signal (voltage signal) by the optical/electric converting unit 32, and sent to the optical output constant control unit 31.

The optical output constant control unit 31 compares the output monitor signal with a reference voltage value set in advance in the optical output constant control unit 31, and controls the pumping source driving unit 11 so that pump light at a level corresponding to a difference in voltage between the output monitor signal and the reference voltage value is outputted from the pumping source 12. Under a control of the optical output constant control unit 31, the pumping source driving unit 11 drives the pumping source 12 to input the pump light to the EDF 20 through the multiplexer 203.

The input monitor signal inputted from the optical/electric converting unit 41 is also sent to the input disconnection detecting unit 11. The input disconnection detecting unit 11 compares the input monitor signal with a reference value set in advance therein, determines that input light is disconnected when the input monitor signal drops below the reference value [refer to C6 in FIG. 4(a)], and sends a signal notifying the switch control unit 82 and the power-on/recovery trigger signal outputting unit 83 that the input light is disconnected.

The switch control unit 82 receiving the signal notifying that the input light is disconnected controls switching of the change-over switch 81 to connect the pumping source driving unit 11 to ground in order to stop supply of the pump light controlled by the optical output constant control unit 31 to the EDF 20. Namely, the pumping source driving unit 11 stops to drive the pumping source 12 in the stop control mode by being grounded to stop driving of the pumping source 12 [refer to C7 in FIG. 4(b)], so that outputting of an optical signal is also stopped [refer to C8 in FIG. 4(c)].

If an optical signal [refer to C9 in FIG. 4(a)] stronger than the input light inputted the last time [refer to C14 in FIG. 4(a)] is inputted when an input optical signal is recovered, the power-on/recovery trigger signal outputting unit 83 sends the power-on/recovery trigger signal to the timer 84 and the switch control unit 82. The switch control unit 82 controls switching of the change-over switch 81 to connect the pumping source driving unit 11 to the pump light control unit 62. Namely, the pumping source driving unit 11 makes the pumping source 12 output pump light in a state where the pumping source driving unit 11 is controlled in the pump light control mode by the pump light control unit 62 [refer to C10 in FIG. 4(b)], so that output light amplified with the pump light is outputted [refer to C11 in FIG. 4(c)].

The optical signal inputted at C9 in FIG. 4(a) has an optical level higher than that of the optical signal inputted at C1 in FIG. 4(a). However, the pump light control unit 62 controls a pump light level according to an input light level, so that pump light outputted at C10 in FIG. 4(b) has a level lower than that of the pump light outputted at C2 in FIG. 4(b).

The optical signal outputted in the EDF 20 is thereby controlled to have a constant optical level in the above pump light control.

After a predetermined time is elapsed [refer to C12 in FIG. 4(b)], a constant controlling trigger signal is inputted from the timer 84 to the switch control unit 82. The switch control unit 82 controls switching of the change-over switch 81 to connect the pumping source driving unit 11 to the optical output constant control unit 31. Namely, the pumping source driving unit 11 makes the pumping source 12 output small pump light according to an optical level of the input light in a state where the pumping source driving unit 11 is controlled in the output constant control mode by the optical output constant control unit 31 [refer to C12 in FIG. 4(b)], so that output light amplified with the pump light is outputted [refer to C13 in FIG. 4(c)].

According to the optical amplifying apparatus and the optical output controlling method by the optical amplifying apparatus according to the first embodiment of this invention, the optical/electric converting unit 41 monitors an optical level of input light when an optical signal inputted through the optical fiber is amplified. When an optical level of the input light drops below a predetermined level, the input disconnection detecting unit 71 detects that the optical input is disconnected so that outputting of pump light is stopped under a control of the switch control unit 82. Accordingly, even if an optical level of the input light drops below a predetermined level, pump light is not inputted from the pumping source 12 to the EDF 20, thereby preventing the EDF 20 from being in a state where the EDF 20 holds an excessive gain.

In the optical amplifying apparatus of this embodiment, the optical/electric converting unit 41 monitors an optical level of input light, the pump converting unit 51 sets an optical level of pump light using an input monitor signal, the optical/electric converting unit 61 monitors an optical level of the pump light, and the pump light control unit 62 controls the pumping source driving unit 11 such that an output level of the monitored pump light is stabilized at the optical level set by the pump converting unit 51. Accordingly, excessive pump light for the input light is not inputted to the EDF 20 so that an optical output at an excessive level is not generated. As a result, no effect is exerted on qualities of optical components connected in the post stages.

Since the optical transmitting apparatus according to this embodiment does not generate output light at an excessive optical level, it is possible to avoid a phenomenon that output light is accumulatively amplified while passing through transmission paths, other repeaters and the like, and the excessive output light is further increased when the terminal receives an optical signal. Therefore, no effect is exerted on qualities of optical components receiving the optical signal in the receiving unit.

According to the optical transmitting apparatus of this embodiment, use of the optical amplifying apparatus 100 and 100' allows a decrease of a transmission path loss in the optical transmitting apparatus, thus a repeater spacing can be increased.

(c) Description of a Second Embodiment of the Invention

Figure 6:
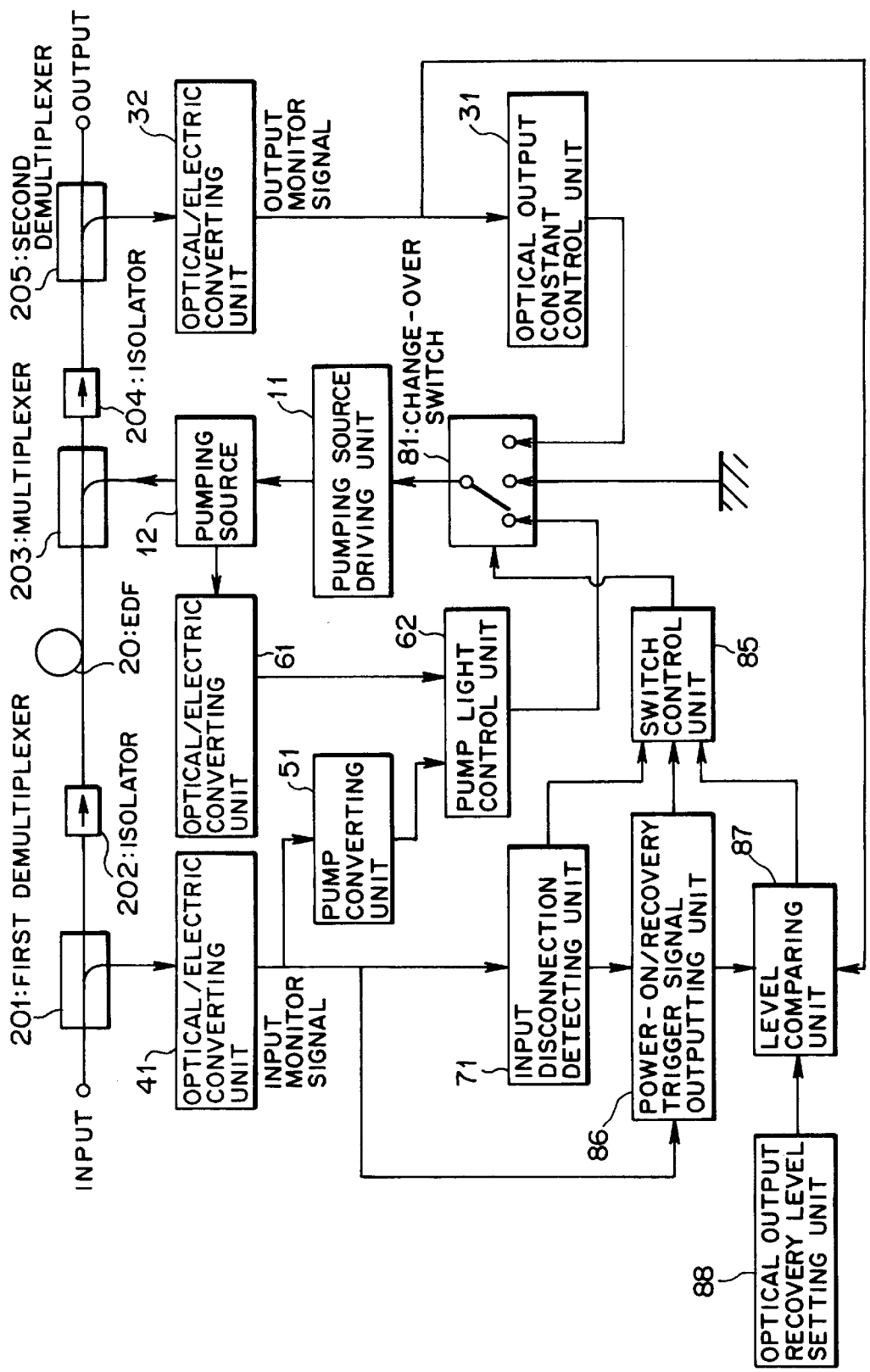
FIG. 6 is a block diagram showing a structure of an optical amplifying apparatus according to a second embodiment of this invention.

FIG. 6 is a block diagram showing a structure of an optical amplifying apparatus according to a second embodiment of this invention. The optical amplifying apparatus shown in FIG. 6 can be used in the optical transmitting apparatus 1000 in the above optical transmission system shown in FIG. 5.

The optical amplifying apparatus according to the second embodiment has, as shown in FIG. 6, a level comparing unit 87 and an optical output recovery level setting unit 88 instead of the timer 84 in the optical amplifying apparatus according to the first embodiment shown in FIG. 2. The other parts are similar to those of the optical amplifying apparatus according to the first embodiment. Incidentally, like reference characters in the drawing designate like or corresponding parts, descriptions of which are thus omitted.

An output monitor signal outputted from the optical/electric converting unit 32 is inputted to the level comparing unit 87. When a power-on/recovery trigger signal is inputted from the power-on/recovery trigger signal outputting unit 86, the level comparing unit 87 compares an output monitor signal inputted from the optical/electric converting unit 32 with a predetermined value set in the optical output recovery level setting unit 88. When an optical signal level of the output monitor signal exceeds the predetermined value set in the optical output recovery level setting unit 88, the level comparing unit 87 outputs a switch controlling trigger signal to the switch control unit 85.

An optical output recovery level (predetermined value) that is an optical level giving an opportunity to switch from the pump light control mode to the output constant control mode at the time of power-on or optical amplifying function recovery is set in the optical output recovery level setting unit 88. The optical output recovery level setting unit 88 outputs the predetermined value to the level comparing unit 87.

Namely, the level comparing unit 87 compares an optical signal level (an optical level of an output monitor signal) amplified by the EDF 20 with a predetermined optical level set in advance. When the amplified optical signal level exceeds the predetermined level as a result of the comparing by the level comparing unit 87, the level comparing unit 87 outputs a constant controlling trigger signal to the switch control unit 85.

The input disconnection detecting unit 71 compares an input monitor signal sent from the optical/electric converting unit 41 with a reference value set in advance in the input disconnection detecting unit 71. When the input monitor signal drops below the reference value, the input disconnection detecting unit 71 determines that input light is disconnected, and notifies the switch control unit 85 and the power-on/recovery trigger signal outputting unit 86 that the input light is disconnected, which corresponds to the input disconnection detecting unit.

The power-on/recovery trigger signal outputting unit 86 outputs a predetermined power-on/recovery trigger signal to the switch control unit 85 and the level comparing unit 87, which are the constant controlling trigger signal outputting unit, when power is on or the optical amplifying function is recovered.

The switch control unit 85 controls the change-over switch 81 on the basis of each trigger signal from the input disconnection detecting unit 71, the power-on/recovery trigger signal outputting unit 86, or the level comparing unit 87 so that the pumping source driving unit 11 operates in any one of the control modes among the output constant control mode, the pump light control mode and the stop control mode.

Incidentally, the level comparing unit 87 and the optical output recovery level setting unit 88 correspond to the constant controlling trigger signal outputting unit. The change-over switch 81, the switch control unit 85, the power-on/recovery trigger signal outputting unit 86, the level comparing unit 87 and the optical output recovery level setting unit 88 correspond to the operation control switching unit.

The optical/electric converting unit 32 outputs an optical signal (a result of monitoring) sent from the second demultiplexer 205 as an electric signal (voltage signal). The optical/electric converting unit 32 converts an optical signal demultiplexed by the second demultiplexer 205 into a voltage signal proportional to an optical input level of the optical signal, and sends the voltage signal as an output monitor signal (voltage signal) to the optical output constant control unit 31 and the level comparing unit 87.

In the optical amplifying apparatus with the above structure according to the second embodiment of this invention, a part of an optical signal inputted to this apparatus is demultiplexed by the first demultiplexer 201, sent to the EDF 20 through the isolator 202, and amplified with pump light inputted from the multiplexer 203 in the EDF 20, in a similar manner in the optical amplifying apparatus according to the first embodiment. The amplified optical signal is sent to the second demultiplexer 205 through the isolator 204, and a part of the optical signal is demultiplexed by the second demultiplexer 205 and outputted as an amplified optical signal.

The part of the amplified optical signal demultiplexed by the second demultiplexer 205 is converted into an output monitor signal which is an electric signal (voltage signal) by the optical/electric converting unit 32. The output monitor signal is sent to the optical output constant control unit 31 and the level comparing unit 87.

A part of an optical signal inputted to the apparatus is demultiplexed by the first demultiplexer 201, sent to the optical/electric converting unit 41, converted into a voltage signal corresponding to an input optical level of the optical signal. The optical signal converted into the voltage signal is then sent as an input monitor signal to the power-on/recovery trigger signal outputting unit 86, the pump converting unit 51 and the input disconnection detecting unit 71, in a similar manner in the optical amplifying apparatus according to the first embodiment shown in FIG. 2.

At the time of power-on or optical amplifying function recovery, the power-on/recovery trigger signal outputting unit 86 outputs a power-on/recovery trigger signal to the switch control unit 85 and the level comparing unit 87, as soon as the input monitor signal is inputted, in a similar manner in the optical amplifying apparatus according to the first embodiment shown in FIG. 2.

The switch control unit 85 receiving the power-on/recovery trigger signal from the power-on/recovery trigger signal outputting unit 86 controls switching of the change-over switch 81 to connect the pumping source driving unit 11 to the pump light control unit 62 such that the pumping source driving unit 11 operates in the pump light control mode, so that pump light controlled by the pump light control unit 62 is outputted from the pumping source 12.

On the other hand, the level comparing unit 87 receiving the power-on/recovery trigger signal from the power-on/recovery trigger signal outputting unit 86 compares an optical level of an output monitor signal inputted from the optical/electric converting unit 32 with a predetermined optical output recovery level inputted from the optical output recovery level setting unit 88, and outputs a constant controlling trigger signal to the switch control unit 85 when an optical level of the output monitor signal exceeds the predetermined optical output recovery level.

The switch control unit 85 receiving the constant controlling trigger signal from the level comparing unit 87 controls switching of the change-over switch 81 to connect the pumping source driving unit 11 to the optical output constant control unit 31 such that the pumping source driving unit 11 operates this time in the output constant control mode, so that pump light controlled by the optical output constant control unit 31 is outputted from the pumping source 12 and an amplified optical signal is outputted.

In a state where an optical signal above a predetermined level is inputted to the apparatus for the purpose of optical amplification, that is, in a state where an input optical signal is in a steady input state, the pumping source driving unit 11 controlled in the output constant control mode by the optical output constant control unit 31 drives the pumping source 12 to supply pump light to the EDF 20, thereby outputting an amplified optical signal, in a similar manner in the optical amplifying apparatus according to the first embodiment. The pump light outputted from the pumping source 12 is also inputted to the optical/electric converting unit 61, converted into a voltage signal, and inputted as a pump light monitor signal to the pump light control unit 62.

The input monitor signal sent as an input monitor signal from the optical/electric converting unit 41 to the input disconnection detecting-unit 71 is detected as to whether an optical input is disconnected or not in the input disconnection detecting unit 71, in a similar manner in the optical amplifying apparatus according to the first embodiment. When optical input disconnection is detected, the pumping source driving unit 11 is grounded, so that inputting of pump light from the pumping source 12 to the EDF 20 is stopped, and outputting of an amplified optical signal is thus stopped.

The optical amplifying apparatus according to the second embodiment of this invention can provide the same effects as the optical amplifying apparatus according to the first embodiment. Moreover, the level comparing unit 87 compares an optical level of an output monitor signal inputted from the optical/electric converting unit 32 with an optical output recovery level inputted from the optical output recovery level setting unit 88, outputs a constant controlling trigger signal when an optical level of the output monitor exceeds the predetermined optical output recovery level, and switches the control from the pump light control mode to the output constant control mode when an optical level of the outputted optical signal exceeds an actual predetermined value, whereby an optical level of an output optical signal is stabilized.

(d) Description of a Third Embodiment of the Invention

Figure 7:
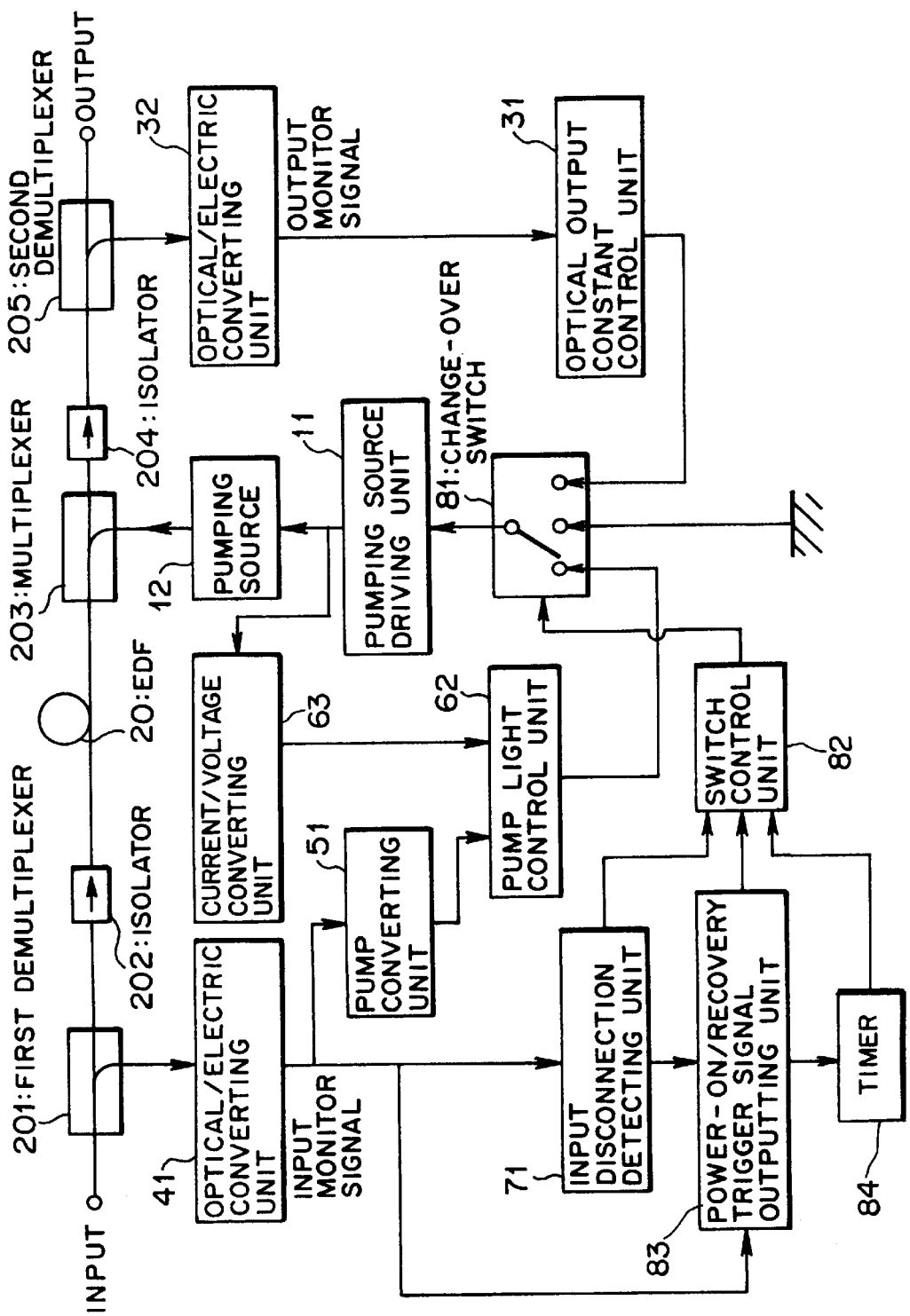
FIG. 7 is a block diagram showing a structure of an optical amplifying apparatus according to a third embodiment of this invention.

FIG. 7 is a block diagram showing an optical amplifying apparatus according to a third embodiment of this invention. The optical amplifying apparatus shown in FIG. 7 can be used in the optical transmitting apparatus 1000 in the above optical transmission system shown in FIG. 5.

The optical amplifying apparatus according to the third embodiment has, as shown in FIG. 7, a current/voltage converting unit 63 in stead of the optical/electric converting unit 61 in the optical amplifying apparatus according to the first embodiment shown in FIG. 2, in which a signal inputted from the pumping source driving unit 11 to the pumping source 12 in also inputted to the current/voltage converting unit 63. The other parts are similar to those of the optical amplifying apparatus according to the first embodiment. Incidentally, like reference characters in the drawing designate like or corresponding parts, descriptions of which are thus omitted.

A part of a pumping source driving current outputted from the pumping source driving unit 11 to the pumping source 12 is branched and inputted to the current/voltage converting unit 63. The current/voltage converting unit 63 is the current/voltage converting unit converting a driving current for outputting pump light into a corresponding voltage signal.

The pump light control unit 62 receives a voltage signal corresponding to the driving current for outputting pump light, which is outputted from the current/voltage converting unit 63, and a voltage signal corresponding to a set optical level of pump light outputted from the pump converting unit 51. The pump light control unit 62 corresponds to the driving control unit controlling the pumping source driving unit 11 such that a voltage signal corresponding to a driving current for outputting pump light outputted from the current/voltage converting unit 63 is stabilized at a voltage signal corresponding to a set optical level of pump light outputted from the pump converting unit 51.

In other words, the pump light control unit 62 can use a voltage signal from the current/voltage converting unit 63 equivalently to the output signal from the optical/electric converting unit 61 in the above first or second embodiment.

In the optical amplifying apparatus with the above structure according to the third embodiment of this invention, a part of an optical signal inputted to the apparatus is demultiplexed by the first demultiplexer 201, sent to the EDF 20 through the isolator 202, and amplified with pump light inputted from the multiplexer 203, in a similar manner in the optical amplifying apparatus according to the first embodiment. The amplified optical signal is sent to the second demultiplexer 205 through the isolator 204, and a part of the optical signal is demultiplexed by the second demultiplexer 205, then outputted as an amplified optical signal.

The other part of the amplified optical signal demultiplexed by the second demultiplexer 205 is converted into an output monitor signal which is an electric signal (voltage signal) by the optical/electric converting unit 32, and sent to the optical output constant control unit 31.

A part of an optical signal inputted to the apparatus is demultiplexed by the first demultiplexer 201, sent to the optical/electric converting unit 41, converted into a voltage signal corresponding to an input optical level of the optical signal, further the optical signal converted into the voltage signal is sent as an input monitor signal to the input disconnection detecting unit 71, the power-on/recovery trigger signal outputting unit 83 and the pump converting unit 51, in a similar manner in the optical amplifying apparatus according to the first embodiment.

At the time of power application or optical amplifying function recovery in the apparatus, the power-on/recovery trigger signal outputting unit 83 inputs a power-on/recovery trigger signal to the switch control unit 82 and the timer 84 as soon as an input monitor signal is inputted to the power-on/recovery trigger signal outputting unit 83, in a similar manner in the optical amplifying apparatus according to the first embodiment shown in FIG. 2.

The switch control unit 82 receiving the power-on/recovery trigger signal from the power-on/recovery trigger signal outputting unit 83 controls switching of the change-over switch 81 to connect the pumping source driving unit 11 to the pump light control unit 62 such that the pumping source driving unit 11 operates in the pump light control mode, so that pump light controlled by the pump light controlling unit 62 is outputted from the pumping source 12.

The pump converting unit 51 sets an optical level of pump light to be outputted from the pumping source 12 on the basis of an input monitor signal, and sends a voltage signal corresponding to the set optical level of pump light to the pump light control unit 62.

The outputted voltage signal for driving the pump source 12 by the pumping source driving unit 11 is also inputted to the current/voltage converting unit 63, converted into a current signal in the current/voltage converting unit 63, then inputted to the pump light converting unit 62. The pump light control unit 62 compares the voltage signal corresponding to a driving current for outputting pump light inputted from the current/voltage converting unit 63 with a voltage signal corresponding to the set optical level of pump light inputted from the pump converting unit 51. The pump light control unit 62 controls the pumping source driving unit 11 such that the voltage signal corresponding to a driving current for outputting pump light becomes equal to the voltage signal corresponding to the set optical level of pump light.

On the other hand, the timer 84 receiving the power-on/recovery trigger signal from the power-on/recovery trigger signal 83 starts to count, and outputs a constant controlling trigger signal to the switch control unit 82 after a predetermined period is elapsed.

The switch control unit 82 receiving the constant controlling trigger signal from the timer 84 controls switching of the change-over switch 81 to connect the pumping source driving unit 11 to the optical output constant control unit 31 such that the pumping source driving unit 11 operates this time in the output constant control mode, so that pump light controlled by the optical output constant control unit 31 is outputted from the pumping source 12.

In a state where an optical signal above a predetermined level is inputted for the purpose of optical amplification, that is, in a state where an input optical signal is in a steady input state, the pumping source driving unit 11 controlled in the output constant control mode by the optical output constant control unit 31 drives the pumping source 12 to supply pump light to the EDF 20, so that amplified signal light is outputted, in a similar manner in the optical amplifying apparatus according to the first embodiment.

The input monitor signal sent as an input monitor signal from the optical/electric converting unit 41 to the input disconnection detecting unit 71 is detected as to whether an optical input is disconnected or not in the input disconnection detecting unit 71, in a similar manner in the optical amplifying apparatus according to the first embodiment. When optical input disconnection is detected, the pumping source driving unit 11 is grounded, so that inputting of pump light from the pumping source 12 to the EDF 20 is stopped, and thus outputting of an amplified optical signal is also stopped.

The optical amplifying apparatus according to the third embodiment of this invention can provide the same effects as the optical amplifying apparatus according to the first embodiment. Moreover, the current/voltage converting unit 63 can directly monitor a driving current driving the pumping source 12 by the pumping source driving unit 11, so as to monitor an output of pump light more accurately. As a result, an optical level of an output optical signal is stabilized.

(e) Description of a Fourth Embodiment of the Invention

Figure 8:
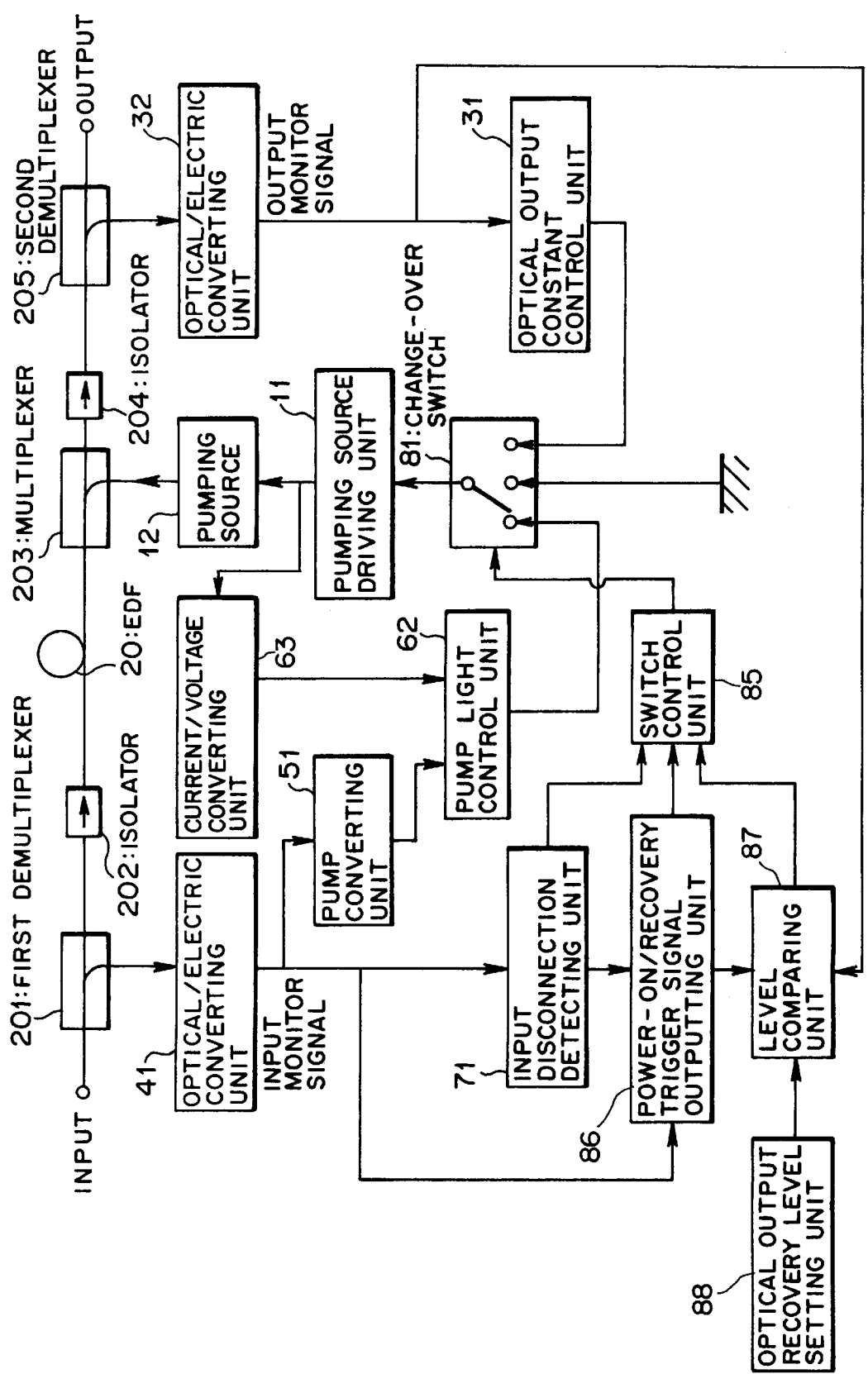
FIG. 8 is a block diagram showing a structure of an optical amplifying apparatus according to a fourth embodiment of this invention.
Figure 9:
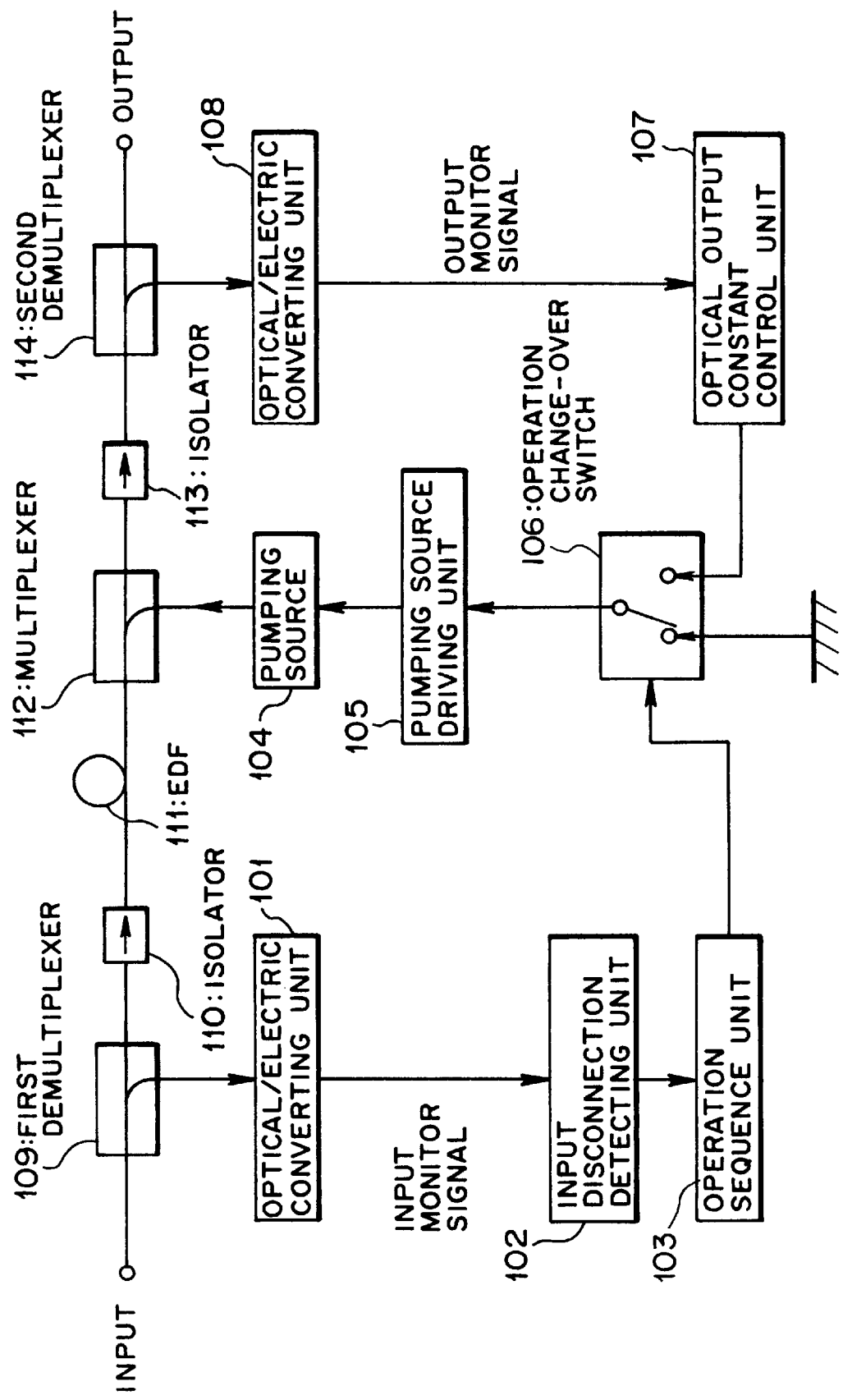
FIG. 9 is a block diagram showing a structure of an optical amplifying apparatus.
Figures 10A, 10B, 10C:
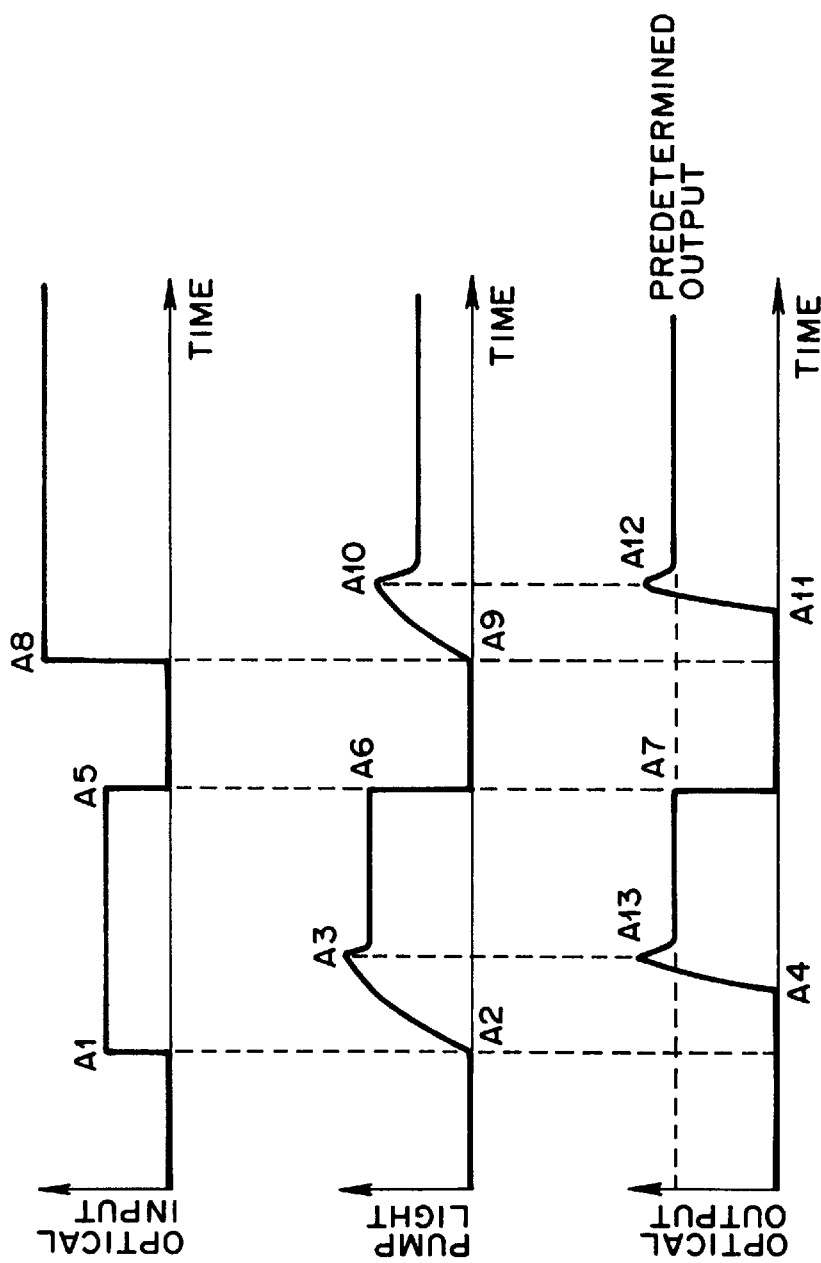
FIGS. 10(a) through 10(c) are diagrams showing with time changes of each light at the time of power-on and input light recovery in the optical amplifying apparatus.
Figure 11:
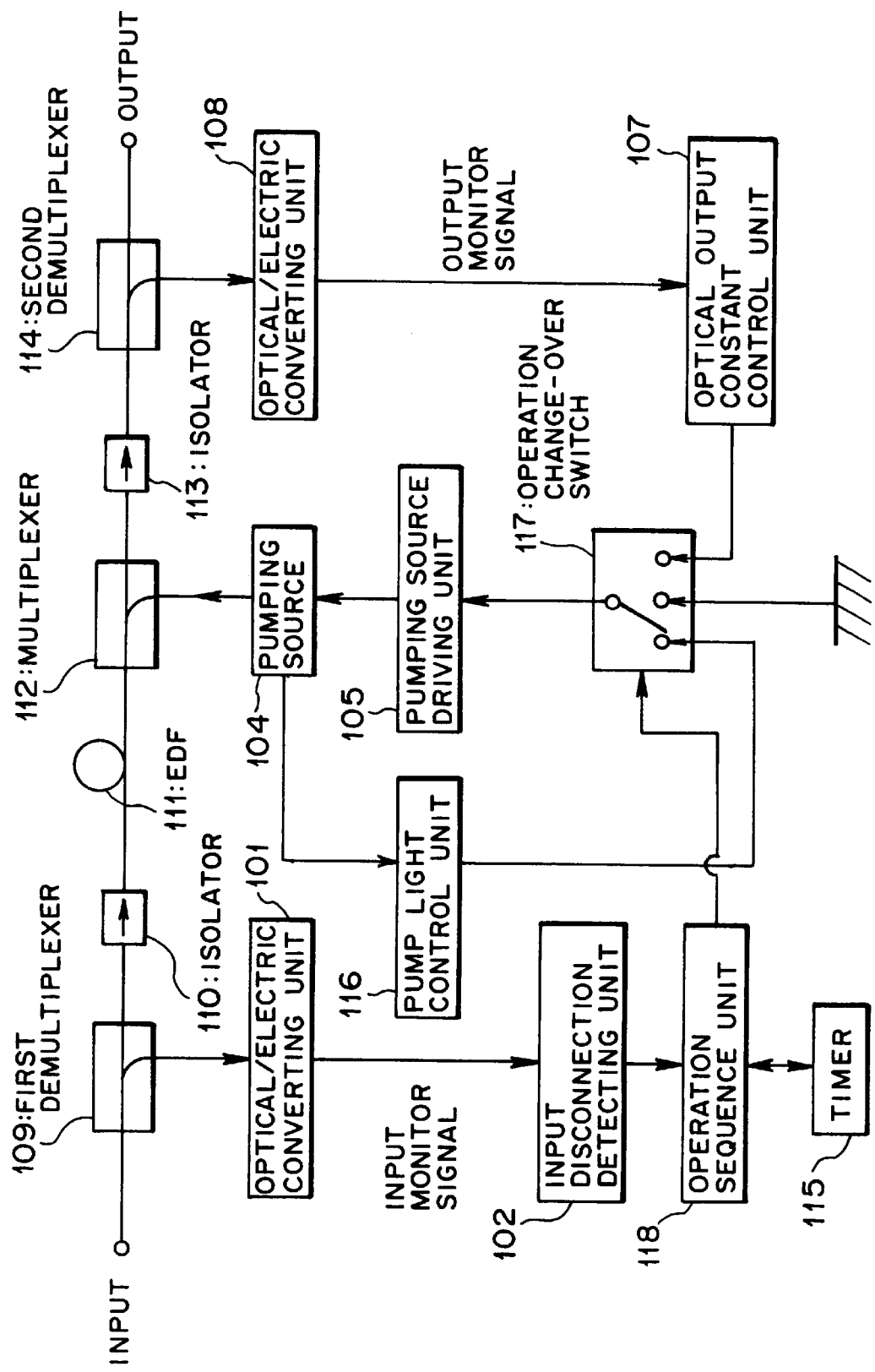
FIG. 11 is a block diagram showing a structure of another optical amplifying apparatus.
Figures 12A, 12B, 12C:
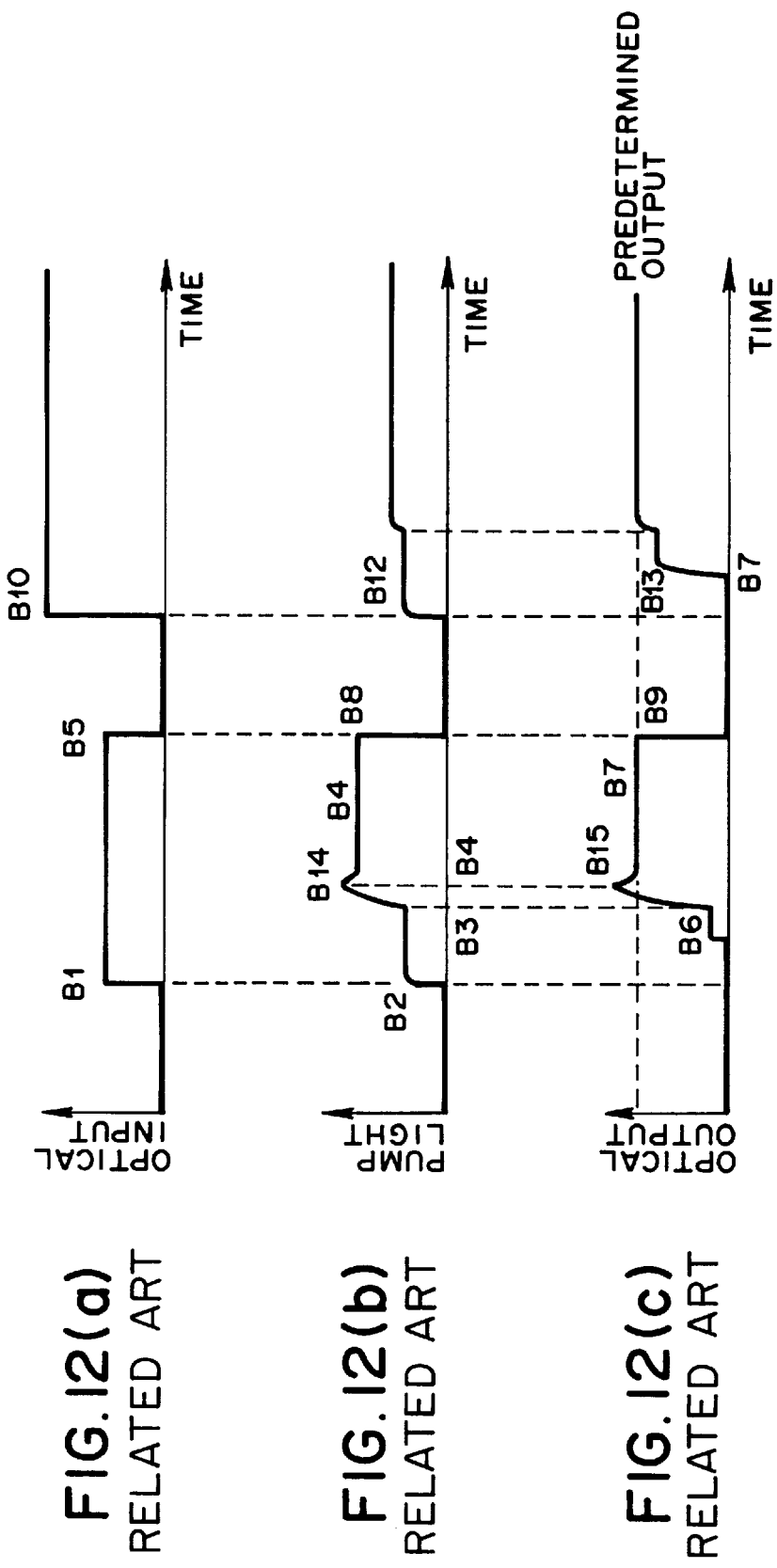
FIGS. 12(a) through 12(c) are diagrams showing with time changes of each light at the time of power-on and input light recovery in the optical amplifying apparatus.

FIG. 8 is a block diagram showing a structure of an optical amplifying apparatus according to a fourth embodiment of this invention. The optical amplifying apparatus shown in FIG. 8 can be used in the optical transmitting apparatus 1000 in the above optical transmission system shown in FIG. 5.

The optical amplifying apparatus according to the fourth embodiment has, as shown in FIG. 8, a current/voltage converting unit 63 instead of the optical/electric converting unit 61 in the optical amplifying apparatus according to the second embodiment shown in FIG. 6, in which a signal inputted from the pumping source driving unit 11 to the pumping source 12 is also inputted to the current/voltage converting unit 63. The other parts are similar to those of the optical amplifying apparatus according to the second embodiment. Incidentally, like reference characters in the drawing designate like or corresponding parts, descriptions of which are thus omitted.

In the optical amplifying apparatus with the above structure according to the fourth embodiment of this invention, a part of an optical signal inputted to the apparatus is demultiplexed by the first demuliplexer 201, sent to the EDF 20 through the isolator 202, and amplified with pump light inputted from the multiplexer 203 in the EDF 20, in a similar manner in the optical amplifying apparatus according to the second and third embodiments. The amplified optical signal is sent to the second demultiplexer 205 through the isolator 204, and a part of the optical signal is demultiplexed by the second demultiplexer 205 and outputted as an amplified optical signal.

The other part of the amplified optical signal demultiplexed by the second demultiplexer 205 is converted into an output monitor signal which is an electric signal (voltage signal) by the optical/electric converting unit 32. The output monitor signal is sent to the optical output constant control unit 31 and the level comparing unit 87.

At the time of power-on or optical amplifying function recovery in this apparatus, the power-on/recovery trigger signal outputting unit 86 inputs a power-on/recovery trigger signal to the switch control unit 85 and the level comparing unit 87 as soon as an input monitor signal is inputted to the power-on/recovery trigger signal outputting unit 86, in a similar manner in the optical amplifying apparatus according to the first embodiment shown in FIG. 2.

The switch control unit 85 receiving the power-on/recovery trigger signal from the power-on/recovery trigger signal outputting unit 86 controls switching of the change-over switch 81 to connect the pumping source driving unit 11 to the pump light control unit 62 such that the pumping source driving unit 11 operates in the pump light control mode, so that pump light controlled by the pump light control unit 62 is outputted from the pumping source 12.

The pump converting unit 51 sets an optical level of pump light to be outputted from the pumping source 12 on the basis of an input monitor signal, and sends a voltage signal corresponding to a set optical level of pump light to the pump light control unit 62.

The outputted voltage signal for driving the pumping source 12 by the pumping source driving unit 11 is also inputted to the current/voltage converting unit 63, converted into a current signal in the current/voltage converting unit 63, then inputted to the pump light control unit 62. The pump light control unit 62 compares the voltage signal corresponding to a driving current for outputting pump light inputted from the current/voltage converting unit 63 with the voltage signal corresponding to the set optical level inputted from the pump converting unit 51. The pump control unit 62 controls the pumping source driving unit 11 such that the voltage signal corresponding to a driving current for outputting pump light becomes equal to the voltage signal corresponding to the set optical level of pump light.

The level comparing unit 87 receiving the power-on/recovery trigger signal from the power-on/recovery trigger signal outputting unit 86 compares an optical level of an output monitor signal inputted from the optical/electric converting unit 32 with an optical output recovery level inputted from the optical output recovery level setting unit 88, and outputs a constant controlling trigger signal to the switch control unit 85 when an optical level of the output monitor signal exceeds a predetermined optical output recovery level.

The switch control unit 85 receiving the constant controlling trigger signal from the level comparing unit 87 controls switching of the change-over switch 81 to connect the pumping source driving unit 11 to the optical output constant control unit 31 such that the pumping source driving unit 11 operates in the output constant control mode this time, so that pump light controlled by the optical output constant control unit 31 is outputted from the pumping source 12.

In a state where an optical signal above a predetermined level is inputted for the purpose of optical amplification, that is, in a state where an input optical signal is in a steady input state, the pumping source driving unit 11 controlled in the output constant control mode by the optical output constant control unit 31 drives the pumping source 12 to supply pump light to the EDF 20, so that amplified optical signal is outputted, in a similar manner in the optical amplifying apparatus according to the second and third embodiments.

An input monitor signal sent as an input monitor signal from the optical/electric converting unit 41 to the input disconnection detecting unit 71 is detected as to whether an optical input is disconnected or not in the input disconnection detecting unit 71, in a similar manner in the optical amplifying apparatus according to the first embodiment. When optical input disconnection is detected, the pumping source driving unit 11 is grounded, so that inputting of pump light from the pumping source 12 to the EDF 20 is stopped, thus outputting of an amplified optical signal is also stopped.

The optical amplifying apparatus according to the fourth embodiment can provide the same effects as the optical amplifying apparatus according to the first embodiment. Moreover, the current/voltage converting unit 63 can directly monitor a driving current for driving the pumping source 12 by the pumping source driving unit 11 so as to monitor an output of pump light more accurately. As a result, an optical level of an output optical signal is stabilized.

Further, the level comparing unit 87 compares an optical level of an output monitor signal inputted from the optical/electric converting unit 32 with an optical output recovery level inputted from the optical output recovery level setting unit 88. When an optical level of the output monitor signal exceeds a predetermined optical output recovery level, the level comparing unit 87 outputs a constant controlling trigger signal to the switch control unit 85. When an optical level of an output optical signal exceeds an actual predetermined level, the control is switched from the pump light control mode to the output constant control mode. As a result, an optical level of an output optical signal is stabilized.

(f) Others

In the above embodiments, the isolators 202 and 204 are disposed on the both ends of the EDF 20. However, this invention is not limited to the above example. These isolators 202 and 204 can be omitted when no problem arise in a viewpoint of characteristics of the optical amplifier. The present invention may be modified in various ways without departing from a scope of the invention.

Further, in the above embodiments, the apparatus has a counterpropagaing pumping configuration in which pump light is inputted from the rear of the EDF 20 via the multiplexer 203. However, the present invention is not limited to this example. The apparatus may have a copropagating pumping configuration in which pump light is inputted from the front of the EDF 20, or a bidirectional propagating pumping configuration in which pump light is inputted from the both directions to the EDF 20. The present invention may be modified in various ways without departing from a scope of the invention.

Still further, in the above embodiments, the optical/electric converting unit 61 converting a pump light output from the pumping source 12 into a voltage signal, or the current/voltage converting unit 63 directly monitoring a driving current driving the pumping source 12 by the pumping source driving unit 11 are used as the pump light monitor control unit 6 monitoring pump light. However, the present invention is not limited to this example, but may be modified in various ways without departing from a scope of the invention.

Still further, in the above embodiments, each operation is switched by the operation switching unit via the operation sequence unit. However, the apparatus may additionally have a function unit operating in any one of control modes for pump light outputted from the pumping source 12 to the EDF 20 among the optical output constant control by the optical output constant control unit 31, the pump light control using a voltage signal from the pump converting unit 51 and the control to stop an output from the pumping source 12, on the basis of at least an input monitor signal from the optical/electric converting unit 41.

Note that the present invention is not limited to the above examples, but may be modified in various ways without departing from a scope of the invention.

What is claimed is:

1. An optical amplifying apparatus comprising:
   a pump light outputting unit for outputting pump light;
   an optical amplifier for amplifying an inputted optical signal with said pump light outputted from said pump light outputting unit, and outputting an amplified optical signal;
   an output constant control unit for controlling said pump light outputting unit such that a level of said amplified optical signal amplified by said optical amplifier is constant;
   an optical input monitoring unit for monitoring an optical input to said optical amplifier;
   a pump light level setting unit for setting an optical level of said pump light on the basis of a result of the optical input monitoring from said optical input monitoring unit;
   a pump light monitor control unit for monitoring a level of said pump light from said pump light outputting unit, and controlling said pump light outputting unit such that said monitored output level of said pump light is stabilized at said optical level set by said pump light level setting unit;
   an input disconnection detecting unit for detecting whether said optical input is disconnected or not on the basis of a result of the optical input monitoring from said optical input monitoring unit; and
   an operation control switching unit for switching a control mode for pump light outputted from said pump light outputting unit to said optical amplifier so that said pump light outputting unit operates in any one of control modes among an output constant control mode by said output constant control unit, a pump light control mode by said pump light monitor control unit, said pump light control mode is a mode in which an output level of said pump light from said pump light outputting unit is controlled such that said monitored output level of said pump light is stabilized at said optical level set by said pump light level setting unit on the basis of the result of monitoring by said optical input monitor unit, and a stop control mode to stop an output of said pump light from said pump light outputting unit, such that an optical output level of said pump light outputted from said pump light outputting unit is constant at the time of power feeding or an optical amplifying function recovery.

2. The optical amplifying apparatus according to claim 1, wherein said operation control switching unit comprising:
   a change-over switch for selectively switching a control signal from said output constant control unit or said pump light monitor control unit to supply said control signal to said pump light outputting unit;
   a power-on/recovery trigger signal outputting unit for outputting a predetermined power-on/recovery trigger signal when power is on or an optical amplification function is recovered;
   a constant controlling trigger signal outputting unit for outputting a constant controlling trigger signal to operate said pump light outputting unit in said output constant control mode after said power-on/recovery trigger signal is outputted from said power-on/recovery trigger signal outputting unit; and
   a switch control unit for controlling said change-over switch on the basis of each of said trigger signals from said power-on/recovery signal outputting unit and said constant controlling trigger signal outputting unit to operate said pump light outputting unit in said output constant control mode, said pump light control mode or said stop control mode.

3. The optical amplifying apparatus according to claim 2, wherein said constant controlling trigger signal outputting unit is configured with a timer being able to output said constant controlling trigger signal after a predetermined time is elapsed from when said power-on/recovery trigger signal is outputted from said power-on/recovery trigger signal outputting unit.

4. The optical amplifying apparatus according to claim 2, wherein said constant controlling trigger signal outputting unit has a level comparing unit for comparing an optical signal level amplified by said amplifier with a predetermined optical level set in advance, and when said amplified optical signal level is higher than said predetermined optical level as a result of the comparing by said level comparing unit, said constant controlling trigger signal outputting unit outputs said constant controlling trigger signal.

5. The optical amplifying apparatus according to claim 1, wherein said pump light monitor control unit has a pump light level monitoring unit for monitoring a level of said pump light outputted from said pump light outputting unit, and a pump light level control unit for controlling said pump light outputting unit such that said level of said pump light monitored by said pump light level monitoring unit is stabilized at an optical level set in said pump light level setting unit.

6. The optical amplifying apparatus according to claim 1, wherein said pump light monitor control unit has a current/voltage converting unit for converting a driving current for outputting said pump light from said pump light outputting unit into a voltage signal, and a driving control unit for controlling said pump light outputting unit such that said voltage signal corresponding to a driving current for outputting said pump light converted by said current/voltage converting unit is stabilized at a voltage signal equivalent to said optical level set by said pump light level setting unit.

7. The optical amplifying apparatus according to claim 1, wherein said optical input monitoring unit outputs said result of monitoring as a voltage signal, and said pump light level setting unit is configured with a voltage converting circuit for converting said voltage signal outputted as said result of monitoring from said optical input monitoring unit into a voltage signal indicating said set optical level of said pump light.

8. An optical output control method by an optical amplifying apparatus having an optical amplifier being able to directly amplify an inputted optical signal with pump light comprising the steps of:
   an output constant control step of controlling said pump light such that a level of said optical signal amplified by said optical amplifier is constant when said inputted optical signal is in a steady input state;
   a stop control step of stopping supply of said pump light controlled at said output constant control step to said optical amplifier when said inputted optical signal is disconnected; and
   a pump light control step of supplying pump light at a predetermined constant optical level set according to a level of said inputted optical signal such that an output level of said pump light is stabilized at an optical level to be constant, said optical level being set on the basis of the result of monitoring of said inputted optical signal, when power-on is detected or an optical signal inputted after supply of said pump light is stopped at said stop control step is recovered;
   wherein when a predetermined time is elapsed from when pump light at said predetermined optical level is supplied at said pump light control step, a control is shifted to said output constant control step.

9. An optical output controlling method by an optical amplifying apparatus having an optical amplifier being able to directly amplify an inputted optical signal with pump light comprising the steps of:
   an output constant control step of controlling said pump light such that a level of said optical signal amplified by said optical amplifier is constant when said inputted optical signal is in a steady input state;
   a stop control step of stopping supply of said pump light controlled at said output constant control step to said optical amplifier when said inputted optical signal is disconnected; and
   a pump light control step of supplying pump light at a predetermined constant optical level set according to a level of said inputted optical signal such that an output level of said pump light is stabilized at an optical level to be constant, said optical level being set on the basis of the result of monitoring of said inputted optical signal when said inputted optical signal is recovered or power-on is detected after supply of said pump light is stopped at said stop control step;
   wherein when a level of an optical signal outputted from said optical amplifier reaches a predetermined level after said pump light at said predetermined constant optical level is supplied at said pump light control step, a control is shifted to said output constant control step.

10. An optical transmitting apparatus having an optical signal generating unit for generating a transmit signal to be transmitted over an optical fiber as an optical signal, and an optical amplifying unit for amplifying said transmit signal generated in said optical signal generating unit and sending said optical signal to said optical fiber comprising:
   said optical amplifying unit comprising:
      a pump light outputting unit for outputting pump light;
      an optical amplifier for amplifying said optical signal inputted from said optical signal generating unit with said pump light outputted from said pump light outputting unit, and outputting an amplified optical signal;

an output constant control unit for controlling said pump light outputting unit such that a level of said amplified optical signal amplified by said optical amplifier is constant;

an optical input monitoring unit for monitoring an optical input to said optical amplifier;

a pump light level setting unit for setting an optical level of said pump light on the basis of a result of the optical input monitoring from said optical input monitoring unit;

a pump light monitor control unit for monitoring a level of said pump light from said pump light outputting unit and controlling said pump light outputting unit such that said monitored output level of said pump light is stabilized at the optical level set by said pump light level setting unit;

an input disconnection detecting unit for detecting whether said optical input is disconnected or not on the basis of the result of the optical input monitoring from said optical input monitoring unit; and an operation control switching unit for switching a control mode for pump light outputted from said pump light outputting unit to said optical amplifier so that said pump light outputting unit operates in any one of control modes among an output constant control mode by said output constant control unit, a pump light control mode by said pump light monitor control unit, said pump light control mode is a mode in which an output level of said pump light from said pump light outputting unit is controlled such that said monitored output level of said pump light is stabilized at said optical level set by said pump light level setting unit on the basis of the result of monitoring by said optical input monitor unit, and a stop control mode to stop an output of said pump light from said pump light outputting unit, such that an optical output level of said pump light outputted from said pump light outputting unit is constant at the time of power feeding or an optical amplifying function recovery.

11. An optical transmitting apparatus having an optical amplifying unit for amplifying an optical signal inputted over an optical fiber, and a receive signal processing unit for performing a receive signal processing on the optical signal amplified by said optical amplifying unit comprising:

said optical amplifying unit comprising:

a pump light outputting unit for outputting pump light;

an optical amplifier for amplifying said optical signal inputted over said optical fiber with said pump light outputted from said pump light outputting unit, and outputting an amplified optical signal;

an output constant control unit for controlling said pump light outputting unit such that a level of said amplified optical signal amplified by said optical amplifier is constant;

an optical input monitoring unit for monitoring an optical input to said optical amplifier;

a pump light level setting unit for setting an optical level of said pump light on the basis of a result of the optical input monitoring from said optical input monitoring unit;

a pump light monitor control unit for controlling said pump light outputting unit such that an output level of said pump light is stabilized at the optical level set by said pump light level setting unit;

an input disconnection detecting unit for detecting whether said optical input is disconnected or not on the basis of the result of the optical input monitoring from said optical input monitoring unit; and an operation control switching unit for switching a control mode for pump light outputted from said pump light outputting unit to said optical amplifier so that said pump light outputting unit operates in any one of control modes among an output constant control mode by said output constant control unit, a pump light control mode by said pump light monitor control unit, said pump light control mode is a mode in which an output level of said pump light from said pump light outputting unit is controlled such that said monitored output level of said pump light is stabilized at said optical level set by said pump light level setting unit on the basis of the result of monitoring by said optical input monitor unit, and a stop control mode to stop an output of said pump light from said pump light outputting unit, such that an optical output level of said pump light outputted from said pump light outputting unit is constant at the time of power feeding or an optical amplifying function recovery.

12. An optical amplifying apparatus, comprising:

a pump light source to produce pump light;

an optical amplifier producing amplified light and receiving the pump light and a signal light supplied thereto;

a pump light level setting unit, operable at least during power feeding, to control the level of the pump light based on characteristics of the signal light supplied to the optical amplifier;

a disconnection detecting unit to stop the production of pump light when the signal light is not supplied to the optical amplifier;

a leveling unit to determine the level of a monitored signal selected from the group consisting of the pump light and the amplified light, and to control the level of the pump light so as to stabilize the monitored signal; and a switch to select at least one of the pump light level setting unit, the disconnection detecting unit and the leveling unit for controlling the pump light source.

* * * * *